United States Patent [19]
Thornton et al.

[11] Patent Number: 5,408,614
[45] Date of Patent: Apr. 18, 1995

[54] MODEM ADAPTER FOR USE WITH STANDARD PC PARALLEL PORT

[75] Inventors: Timothy J. Thornton, Camarillo; Robert Rosen, Agoura Hills; Eric K. Henderson, Agoura, all of Calif.

[73] Assignee: Xircom, Inc., Calabasas, Calif.

[21] Appl. No.: 170,088

[22] Filed: Dec. 17, 1993

[51] Int. Cl.⁶ .............................................. G06F 13/00
[52] U.S. Cl. ..................... 395/275; 375/222; 379/97; 364/708.1
[58] Field of Search .............. 375/8; 395/200, 275; 379/97; 364/709.01, 708.1

[56] References Cited

U.S. PATENT DOCUMENTS

| | | | |
|---|---|---|---|
| 4,641,263 | 2/1987 | Perlman et al. | 364/900 |
| 4,672,570 | 6/1987 | Benken | 364/900 |
| 4,682,352 | 7/1987 | Durham | 379/98 |
| 4,812,847 | 3/1989 | Stewart et al. | 341/154 |
| 4,914,688 | 4/1990 | Kobayashi et al. | 379/93 |
| 5,033,062 | 7/1991 | Morrow et al. | 375/7 |
| 5,276,443 | 1/1994 | Gates et al. | 340/825.06 |
| 5,299,314 | 3/1994 | Gates | 395/200 |

*Primary Examiner*—Robert L. Richardson
*Attorney, Agent, or Firm*—Freilich, Hornbaker & Rosen

[57] ABSTRACT

A modem adapter for use with a standard parallel port of a personal computer (PC) for interfacing to the public switched telephone network (PSTN). The modem adapter accepts digital data, eight bits at a time, from a standard PC parallel port and modulates this digital data into an analog format, compatible with the PSTN. Conversely, the modem adapter accepts analog data from the PSTN and converts it into digital data and transfers this data to the parallel port, at least four bits at a time. The modem adapter of the present invention thus neither requires any additional circuit cards in the PC's card slots nor dedication of any of the existing serial ports. Redirector software intercepts software I/O instructions directed toward a serial I/O port and redirects and reformats these instructions to the modem adapter through the parallel port. This redirection permits existing modem control software to be used without modification with the modem adapter of the present invention.

27 Claims, 28 Drawing Sheets

FIG. 1

1. Out instruction to data port.
2. Trap by redirector.
3. Send data to adapter.

FIG. 5A

1. In instruction from data port.
2. Trap by redirector.
3. Read data from the adapter.
   (Data may have already arrived and was stored; in this case the redirector will simply return what was stored.)

FIG. 5B

1. In instruction from status port.
2. Trap by redirector.
3. Get adapter status; translate it into UART status; return that value.

FIG. 5C

1. Out instruction to control port.
2. Trap by redirector.
3. Translate it into an analogous control command to send to the adapter.

FIG. 5D

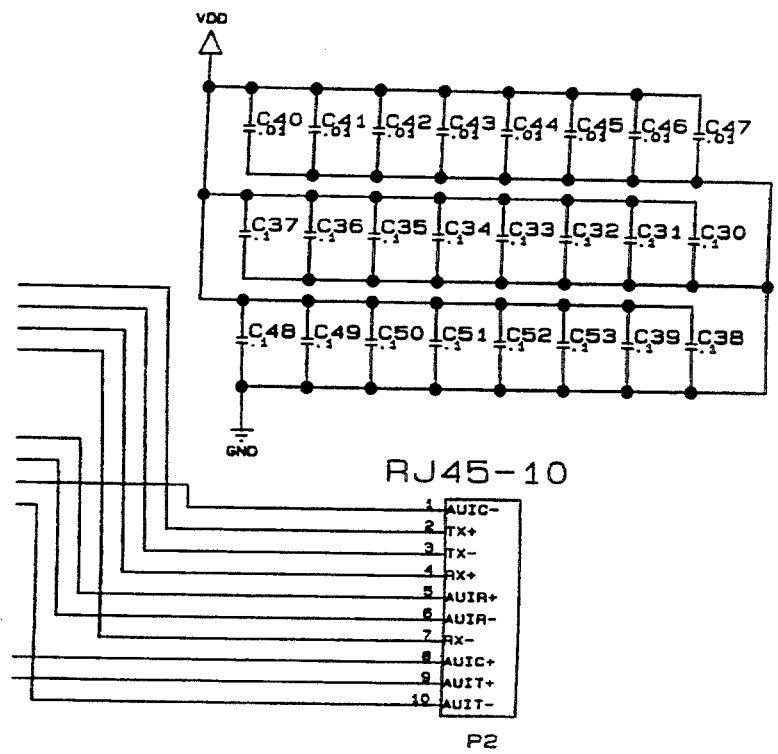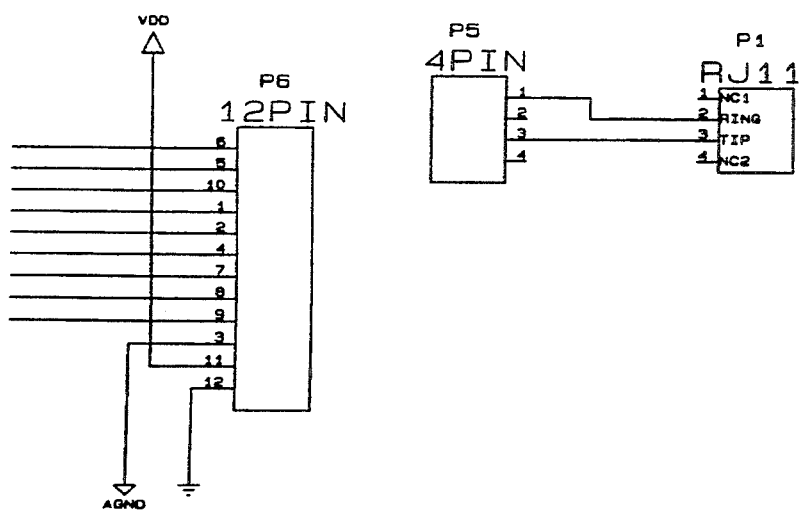
FIG. 13C

MODEM ADAPTER FOR USE WITH STANDARD PC PARALLEL PORT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates generally to hardware/software communication systems of the type used to connect a personal computer (PC) to public switched telephone networks (PSTNs) for access to timeshare networks, e.g., Prodigy, Compuserve, bulletin board systems (BBS), etc., or to another PC. Such communication systems include modem or fax-modem adapters that generally are constructed around chip sets that are commercially available from different manufacturers, e.g., AT&T, Rockwell, and Phylon.

Commercially available modem adapters are characterized as either internal or external types, colloquially known as internal or external modems. In an internal modem, a modem chip set is mounted on a circuit card that is physically plugged into a PC card slot. This card slot is integral to a mother board that contains the microprocessor that controls the PC. The circuit card additionally contains circuitry for interfacing to an internal address/data/control bus within the PC that functions as the communication path with the microprocessor. This communication with the modem chip set is normally done a byte or eight bits at a time according to a defined interface protocol of the address/data/control bus. However, card slots on a PC are a limited resource. Typically, there is a maximum of eight card slots on the mother board of a PC of which some are dedicated to other functions, e.g., a video display controller, a disk controller, a serial and a parallel port interface, a sound and CD-ROM controller, etc. Thus, a card slot may not be available for all applications. Additionally, the use of a card slot requires opening the cabinet of the PC. While this task is minimal to one of ordinary skill in the art, it may be intimidating to an ordinary user who is normally not skilled in the art of personal computers. Also, some PCs, e.g., laptop computers, may have no user-accessible card slots.

In an external modem, a modem chip set and associated circuitry are placed in a housing external to the PC and interfaced either directly at a serial port connector or using a cable to serial interface circuitry that is internal to the PC. However, while most PCs have a serial port, not all PCs have a serial port available for use in interfacing to an external modem. For example, existing serial ports may be dedicated to interface to a mouse, a printer, a laptop computer, etc. Once the existing serial ports have been used, additional ones may only be added by using an additional card slot to add an interface/control card. However, as previously discussed, card slots are a limited resource and, with a laptop, none may be available at all. Also, the number of serial ports is limited based upon the original architecture of the PC. While the architecture of the PC permits up to four serial ports, standards exist for only the first two serial ports. Thus, it is commonplace to encounter hardware conflicts when attempting to expand a PC beyond these first two serial ports. Additionally, the use of a serial interface may degrade the throughput performance of a system since serial interfaces can only communicate one bit at a time.

A vast library of modem control software currently exists to interface to commercially available internal or external types of modems. Thus, it is desirable that any new system appear indistinguishable at its software interface to existing software systems.

SUMMARY OF THE INVENTION

The present invention is directed toward a modem adapter capable of being interfaced to a PC through a standard PC parallel port and by using redirector software is capable of directly using the existing library of modem control software without special modifications, i.e., the interface to the modem adapter is transparent to the modem control software.

The modem adapter of the present invention accepts digital data and control information, eight bits at a time from a standard PC parallel port, and modulates the digital data into an analog format compatible with a public switched telephone network (PSTN). Conversely, the modem adapter of the present invention demodulates analog data from the PSTN into digital data and transfers this data, at least four bits at a time, to the PC internal bus via the parallel port.

A modem adapter in accordance with the invention preferably includes a parallel port controller capable of interfacing to different types of standard PC parallel ports that can be present on a PC. A similar parallel port controller has already been disclosed in a commonly assigned application to Dirk I. Gates, Ser. No. 08/117,990, now U.S. Pat. No. 5,299,314, which is incorporated herein by reference. While all standard PC parallel ports can output an eight-bit data byte in parallel, the input capability of different standard PC parallel ports is limited. In a first type of parallel port (e.g., PC-XT), since the data lines are unidirectional out, the available status lines are used to transfer data into the PC in a nibble (or quasi-nibble) mode, i.e., four bits at a time. A second type of parallel port (e.g., PC-AT), can be made to accept input data via its data lines by setting them to a "1" state. In a third type of parallel port (e.g., IBM-PS/2), a control line is used to set the direction of transfer over its bidirectional data lines. A fourth type of parallel port (e.g., EPP, enhanced parallel port) allows faster transfers by automatically generating control strobes in hardware. In operation, the preferred modem adapter first identifies the type of PC parallel port to which it is connected and then adapts to the most efficient transfer mode, i.e., either bidirectional or nibble mode.

Embodiments of the present invention preferably utilize software resident on the PC which intercepts software I/O instructions directed toward a serial I/O port. Once the software I/O instruction is detected, it is redirected to software that reformats the intercepted I/O instruction and transfers an equivalent command to the modem adapter using the standard PC parallel port. By intercepting these serial I/O instructions, the type of modem adapter becomes indistinguishable to existing modem control software. Thus, this existing software can use the modem adapter of the present invention without modifications.

The present invention also discloses the packaging of a LAN control and interface, a modem control and interface and parallel port sharing circuitry in a single package that externally plugs directly into a standard PC parallel port, thus providing expansion capability for a PC within the capabilities of an ordinary PC user.

Additionally, the present invention discloses downloading of all executable modem control software to the modem control and interface from a PC. This permits software modifications or upgrades to the modem control and interface without requiring any physical modifications or resident nonvolatile memory.

In accordance with a preferred embodiment, the modem adapter is primarily comprised of (1) a parallel port controller capable of interfacing with standard PC parallel ports, (2) a modem controller, coupled to the parallel port controller, and (3) a modem module which responds to the modem controller to supply analog signals to the PSTN and responds to analog signals from the PSTN to provide digital signals to the modem controller.

In accordance with a further aspect of the preferred embodiment, redirector software is installed on a host PC to intercept I/O commands to its serial port, reformat and subsequently redirect the reformatted commands to the modem adapter of the present invention through a standard PC parallel port, thus permitting use of existing modem control software with the present invention.

In a preferred embodiment of the invention, both a modem control and interface and a LAN control and interface share a common parallel port controller and are contained in a common housing. The common housing is preferably provided with an external connector or configured to plug into a standard PC parallel port external connector.

Other features and advantages of the present invention should become apparent from the following description of the presently-preferred embodiments, taken in conjunction with the accompanying drawings, which illustrate, by way of example, the principles of the present invention.

BRIEF DESCRIPTION OF THE DRAWINGS

FIGS. 5A–5D are flow charts depicting examples of the operation of the redirector software;

DESCRIPTION OF THE PREFERRED EMBODIMENTS

Figure 1:
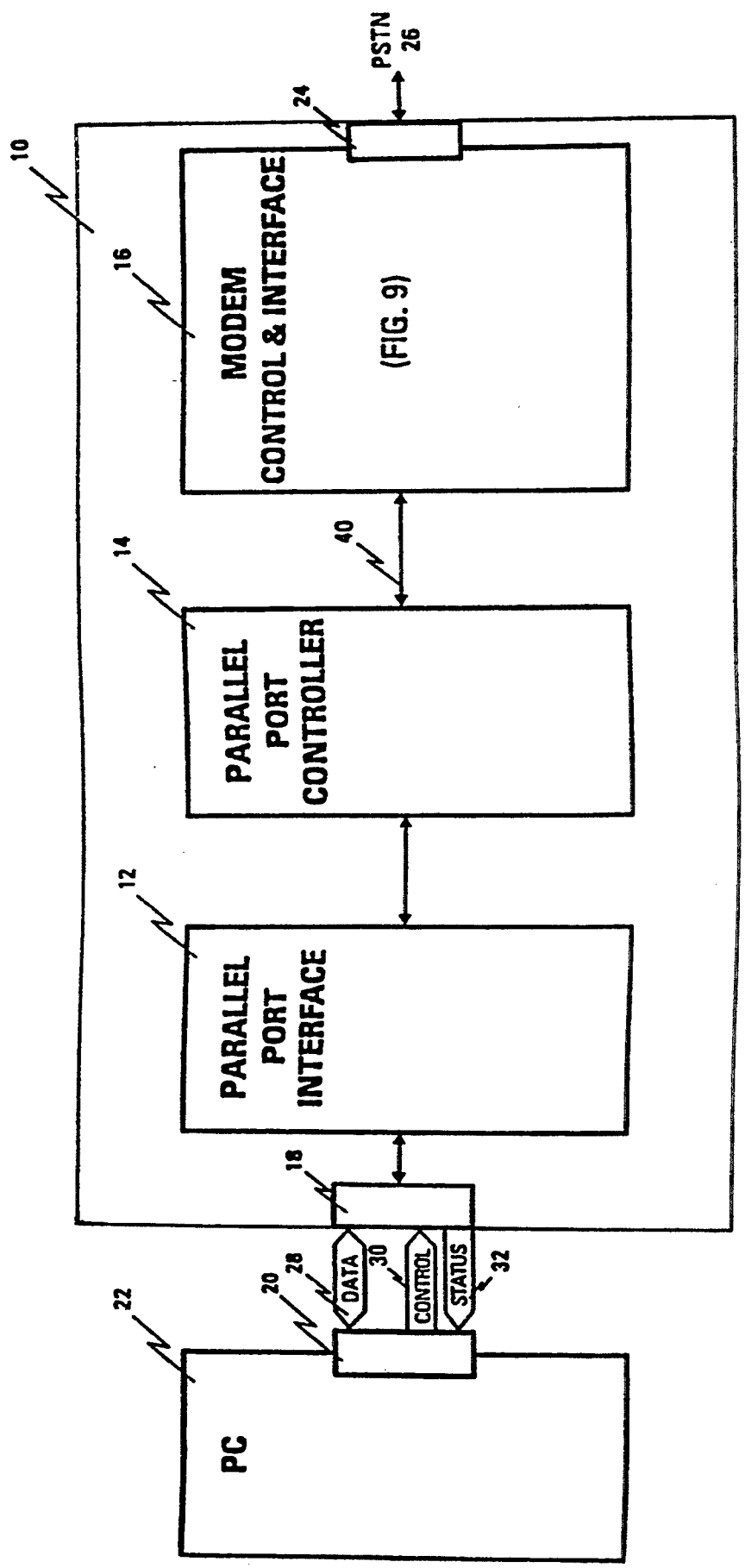
FIG. 1 comprises a functional block diagram of a preferred modem adapter in accordance with the present invention.

Throughout the following detailed description, similar reference characters refer to similar elements in all figures of the drawings.

With reference now to the drawings, and particularly to FIG. 1, there is shown a block diagram of a preferred embodiment of a modem adapter 10 of the present invention. The purpose of the modem adapter 10 is to enable personal computers, principally IBM and compatible personal computers (PCs), to be readily connected to public switched telephone networks (PSTNs) and thus permitting connection to timeshare networks, other personal computers, or any other modem or FAX interfaceable service accessible over a PSTN, sometimes referred to as a wide area network or WAN. Such a personal computer is controlled by a microprocessor (e.g., an Intel 80×86) that interfaces to the personal computer over an internal bus. A standard PC parallel port having an external connector is interfaced to the PC internal bus and controlled by the microprocessor.

The electronics for the modem adapter 10 is carried by multiple circuit boards (not shown) fully contained within a modem housing (described below). The modem adapter 10 may appropriately be considered as being primarily comprised of three functional portions; i.e., a parallel port interface 12, a parallel port controller 14, and a modem control and interface 16. The parallel port interface 12, coupled to a parallel port connector 18 (typically, male), is physically and electrically configured to interface to a female connector of a standard PC parallel port 20 on a PC 22. The parallel port controller 14 is coupled to the parallel port interface 12 and functions to bidirectionally transfer data to the standard PC parallel port 20. The parallel port controller 14 is also coupled to the modem control and interface 16 to transfer this data for modulation and demodulation according to CCITT defined specifications. The modem control and interface 16 is coupled to an RJ-11 connector which is coupled to a telephone network (PSTN) 26.

TABLE 1

| DB-25 | Pin Definition | Type |
|---|---|---|
| 1 | strobe | control, RDS |
| 2 | data bit 0 | data |
| 3 | data bit 1 | data |
| 4 | data bit 2 | data |
| 5 | data bit 3 | data |
| 6 | data bit 4 | data |
| 7 | data bit 5 | data |
| 8 | data bit 6 | data |
| 9 | data bit 7 | data |
| 10 | acknowledge | status |
| 11 | busy | status |
| 12 | paper end | status |

TABLE 1-continued

| DB-25 | Pin Definition | Type |
|---|---|---|
| 13 | select | status |
| 14 | auto feed | control, RAS |
| 15 | fault | status |
| 16 | initialize printer | control |
| 17 | select input | control |
| 18 | ground | |
| 19 | ground | |
| 20 | ground | |
| 21 | ground | |
| 22 | ground | |
| 23 | ground | |
| 24 | ground | |
| 25 | ground | |

The function and operation of the parallel port control 14 in coordination with the parallel port interface 12 is described in said application 08/117,990. The parallel port connector 18 is coupled to the parallel port interface 12 with an interface comprised of an eight-bit data path 28, a four-bit control path 30 and a five-bit status path 32. The parallel port interface 12 is comprised of bidirectional buffers on the data 28 and unidirectional buffers on the control 30 and status 32 lines associated with the standard PC parallel port 20. The definition of the standard signals found on the 25-pin standard PC parallel port 20 is found in Table 1. Additionally, the location of expanded signals RDS and RAS, described below, are found in Table 1.

As disclosed in this commonly assigned application, the parallel port controller 14 is capable of interfacing to different types of standard PC parallel ports. With a first type of parallel port, as originally found in the PC-XT, the data path 28 is unidirectional and thus the status lines 32 are used in a nibble (or quasi-nibble) mode, i.e., four bits at a time, to transfer data into the standard PC parallel port 20. With a second type of parallel port, as originally found in the PC-AT, the data path 28 is bidirectional provided that the data lines are set to a "1" or high state prior to inputting data. In this condition, due to the ability of a low TTL signal to override a high TTL signal, bidirectional operation can be achieved. With the third type of parallel port, as originally found in the IBM-PS/2, a status line can be directly controlled to permit true bidirectional use of the data path 28. As previously disclosed, an initialization sequence determines the optimum choice among these possibilities and downloads programmable logic within the parallel port controller 14 to configure the interface. In a preferred embodiment, the programmable logic is implemented with a field programmable gate array (FPGA).

Additionally, the parallel port controller 14 of the present invention supports an enhanced parallel port or EPP as described in the Mar. 17, 1992 Release 1.7 to the IEEE P1284 Working Group that redefines the use of the pins on a parallel port. According to this standard, a data strobe on pin 14 (formerly auto feed) and a write signal on pin 1 (formerly strobe) are automatically generated by EPP hardware during an output instruction. This state remains until the device connected to the parallel port returns a wait signal on pin 11 (formerly busy). In a similar manner, an input instruction to an EPP automatically generates only a data strobe on pin 14 to signal the device connected to the parallel port to place data on the bidirectional data bus. The device then signals that the data is available with the wait signal on pin 11. By adapting to this standard, the present invention can transfer data across the parallel port at rates approaching that possible with a standard internal adapter card that is interfaced directly to a PC via its internal address/data/control bus.

TABLE 2

| Data Modulation |
|---|
| CCITT V.32bis with trellis coding at 14400 bps, 12000 bps, 9600 bps and 7200 bps |
| CCITT V.32bis at 4800 bps |
| CCITT V.32 with trellis coding at 9600 bps |
| CCITT V.32 at 4800 bps |
| CCITT V.22bis at 2400 bps |
| CCITT V.22 at 1200 bps |
| Bell 212A at 1200 bps |
| Error Control |
| CCITT V.42 LAP-M |
| MNP Class 2, 3, and 4 |
| Data Compression |
| CCITT V.42bis |
| MNP Class 5 |
| Fax modulation |
| Group 2 send/receive fax communication under the control of Class 1 or Class 2 software, using: |
| CCITT v.17 at 14400 bps, 12000 bps, 9600 bps, 7200 bps, and 4800 bps |
| CCITT v.29 at 9600 bps, 7200 bps, and 4800 bps |
| CCITT V.27ter at 4800 bps and 2400 bps |

Figure 2:
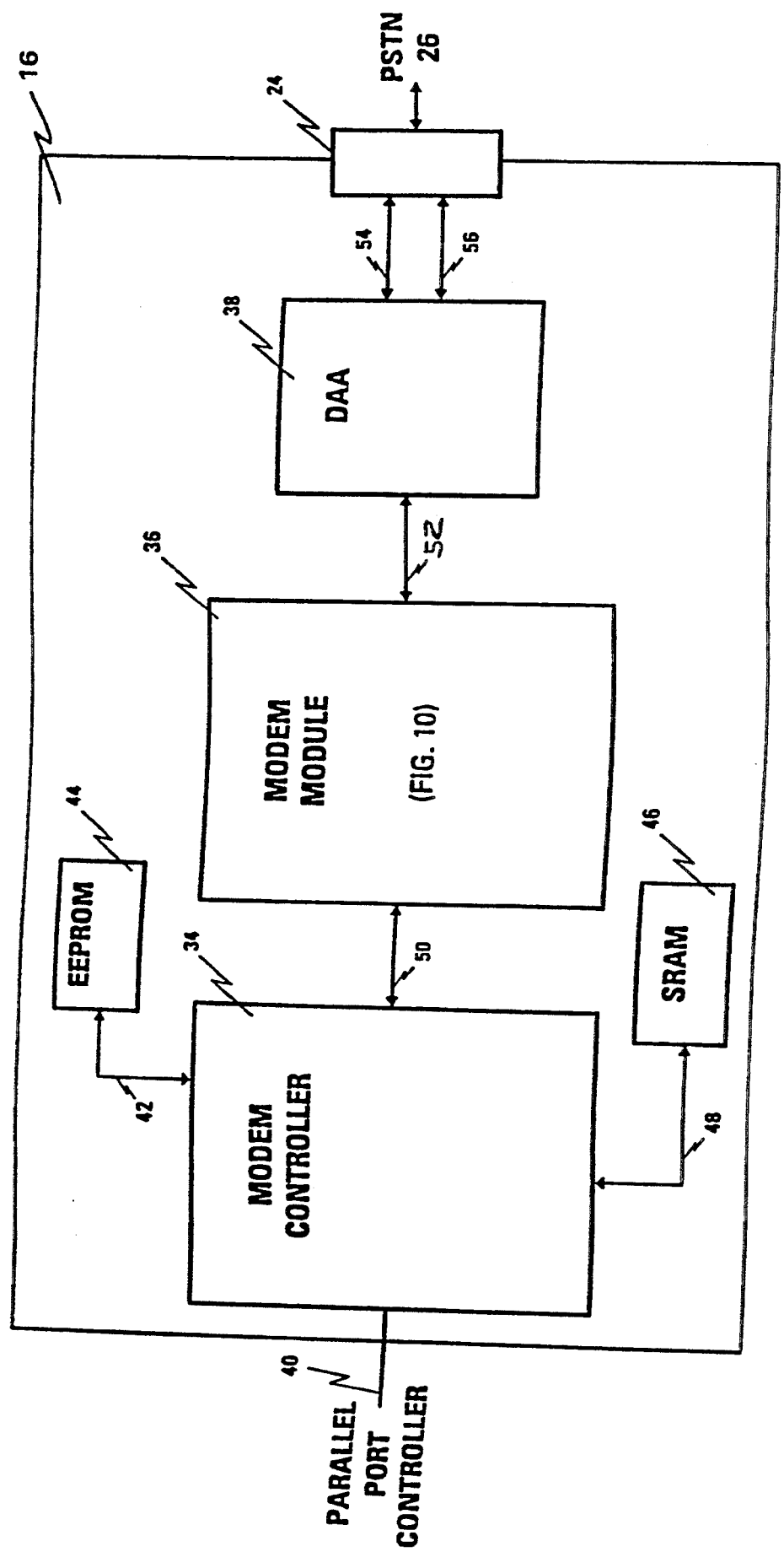
FIG. 2 is a block diagram of a preferred modem and control interface.

With reference now to FIG. 2, a block diagram of the modem control and interface 16 is shown. The specifications for the modem and control interface 16 are shown in Table 2. The modem control and interface 16 is primarily comprised of a modem controller 34, a modem module 36, and a data access arrangement (DAA) 38. Devices which form the modem module 36 are readily available as integrated circuit chips and are sold as modem chip sets by various semiconductor manufacturers. Although functionally similar overall, chip sets by different manufacturers may require different divisions within the modem and control interface 16. These alternative divisions still embody the modem control and interface 16 of the present invention. A particular preferred embodiment will now be discussed for the modem control and interface 16.

The modem controller 34, an MC68302 in a preferred embodiment, functions to control the transfer of all data between the standard PC parallel port 20 and the PSTN 26 according to standard protocols including the Hayes and Microcom command sets. The modem controller 34 is coupled to the parallel port controller 14, using address/data/control bus 40, which functions as a PC interface for bidirectionally communicating data and commands to the PC 22 via the parallel port controller 14.

TABLE 3

| Register | Address | Host | Modem | Description |
|---|---|---|---|---|
| Host Data | F0 | Write | Read | Data output to modem |
| Host Data | F0 | Read | Write | Data output to host |
| Host Command | F1 | Write | Read | Software Command/ Status |
| Modem Command | F1 | Read | Write | Software Command/ Status |
| Host Control | F2 | Write | — | Host IRQ output control |
| Modem Control | F2 | — | Write | Modem IRQ output control |
| Host Status | F3 | — | Read | Hardware status |
| Modem Status | F3 | Read | Write | Hardware status |

The parallel port controller 14 contains registers as shown in Table 3 for facilitating the transfer of data between the standard PC parallel port 20 and the modem controller 34. When the PC 22 transfers data to the modem adapter, the PC 22 first loads one of these registers within the parallel port controller 12. The modem controller 34 then accesses this data from this intermediate register. Similarly when the modem controller 34 transfer data to the PC 22, these intermediate registers are used. To output to one of these registers, the PC must first address the particular desired register. This task is done by placing the address of the register, e.g., F0, on data bits 0–7 and strobing the RAS (register address strobe), the auto feed control in the standard parallel port configuration. Once the register has been selected, a subsequent strobe on the RDS (register data strobe), the strobe in the standard parallel port configuration, will output data bits 0–7 to the selected register. To input from a register, data bit 2 is ORed with the register address when the register is selected. Thus, selecting register F0 for a subsequent read is done using address F4 (F0 OR 4). In a preferred embodiment, the parallel port controller 14 is a FPGA, field programmable gate array. The configuration of the FPGA is initially downloaded from the PC using the standard parallel port 20 to form the previously described logic.

The modem controller 34 is bidirectionally coupled using path 42 to a serial EEPROM 44, which is used to store modem configuration data, and a SRAM 46, using address/data bus 48, which is used to store modem data and program code. As part of an initialization operation, the SRAM 46 is downloaded with software that the modem controller 34 subsequently executes. This downloading operation proceeds as follows. Initially, the modem controller, an MC68302 in a preferred embodiment, fetches two 32-bit addresses, one byte at a time, from address 0 corresponding to a start address and a stack pointer. In a preferred embodiment, there initially is no memory associated with any memory addresses. Instead, the parallel port controller 14, responds to memory access strobes and supplies the initial addresses. The parallel port controller 14 then requests instructions, from the PC 22 one byte at a time which are executed by the modem controller 34. Initially, these instructions download a bootstrap loader into SRAM 46. When the bootstrap loader is completely downloaded, the modem controller begins executing this bootstrap loader from the SRAM 46. The bootstrap loader then downloads the modem control software from the PC 22 into the SRAM 46 and transfers control to the modem control software. Thus, all of the modem control software is stored on the PC 22, normally on a hard or floppy disk, and transferred to the modem controller 34 without requiring any resident non-volatile memory, e.g., ROM. Consequently, enhancements or modifications to the modem control software do not require any alterations to hardware that embodies a modem adapter of the present invention.

The modem module 36, an AT&T V.32 Data Pump chip set in a preferred embodiment, is bidirectionally coupled to the modem controller 34 using digital signal path 50 as well as to the DAA 38, using preconditioned analog signal path 52. The DAA 38 is coupled using ring path 54 and tip path 56 to an RJ-11 connector 24 which is coupled to the PSTN 26. The DAA 38 preconditions signals to and from the PSTN 26 as well as providing signal protection, required when connecting to various PSTNs, to form preconditioned analog signals on path 52. The preconditioned analog signals are bidirectionally input to the modem module 36 which converts these analog signals into digital form on digital signal path 50 for protocol processing by the modem controller 34.

Digital signal path 50 consists of two interfaces that the modem controller 34 uses to communicate with the modem module 36. The first interface communicates in parallel to the modem controller 34 eight bits at time. In a preferred embodiment, the modem controller 34 uses the parallel interface to control and interrogate the status of the modem module 36. The second interface is a serial interface. The serial interface is comprised of a first full duplex USART (universal synchronous/asynchronous receive/transmitter) integrally located with the modem controller 34 and a second full duplex USART within the modem module 36. The serial interface is used to exchange data that is received from or transmitted to the public switched telephone network (PSTN) 26.

Figure 10A:
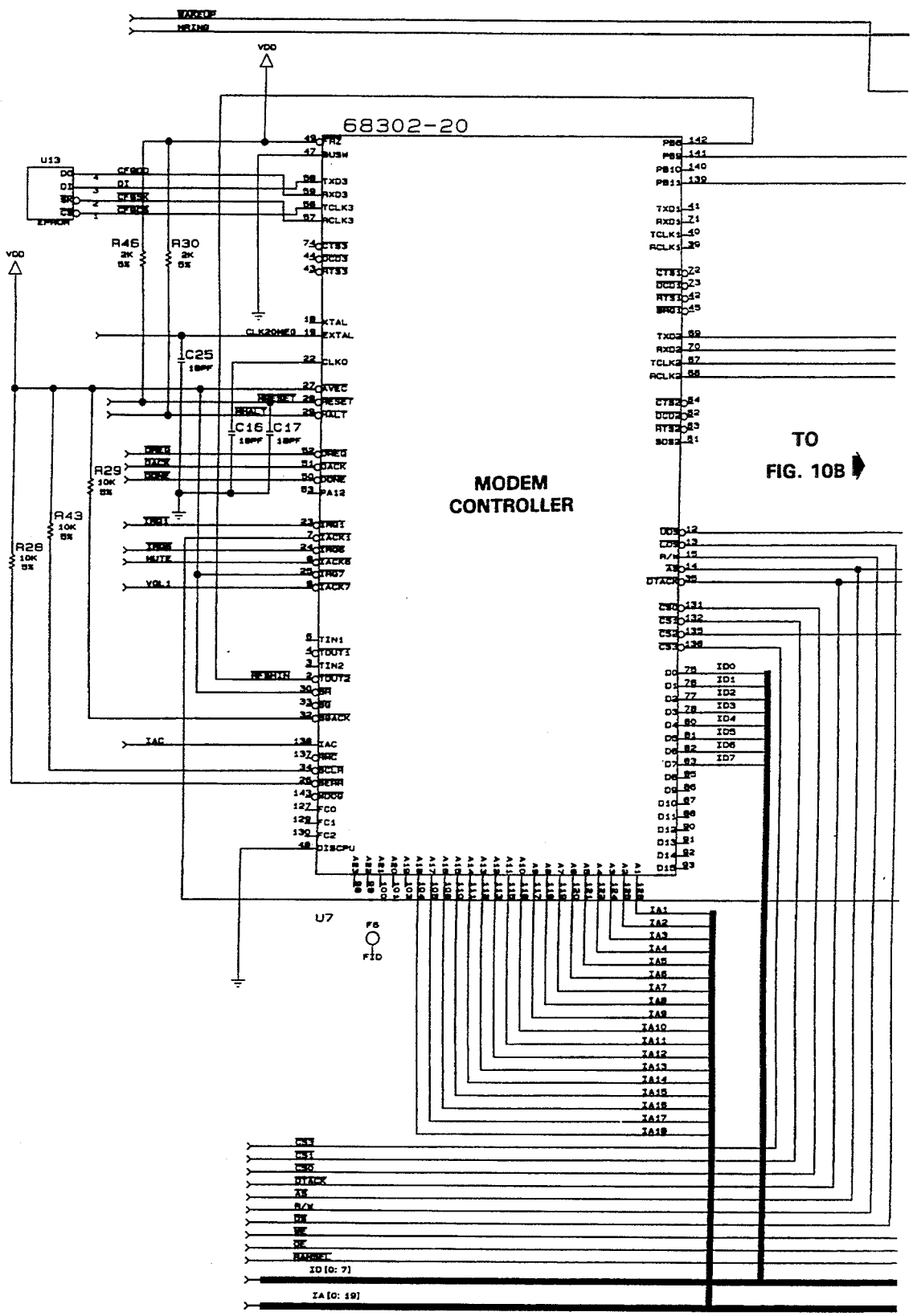
FIG. 10 is a top level schematic diagram of the modem controller and modem module in a preferred embodiment.
Figure 10B:
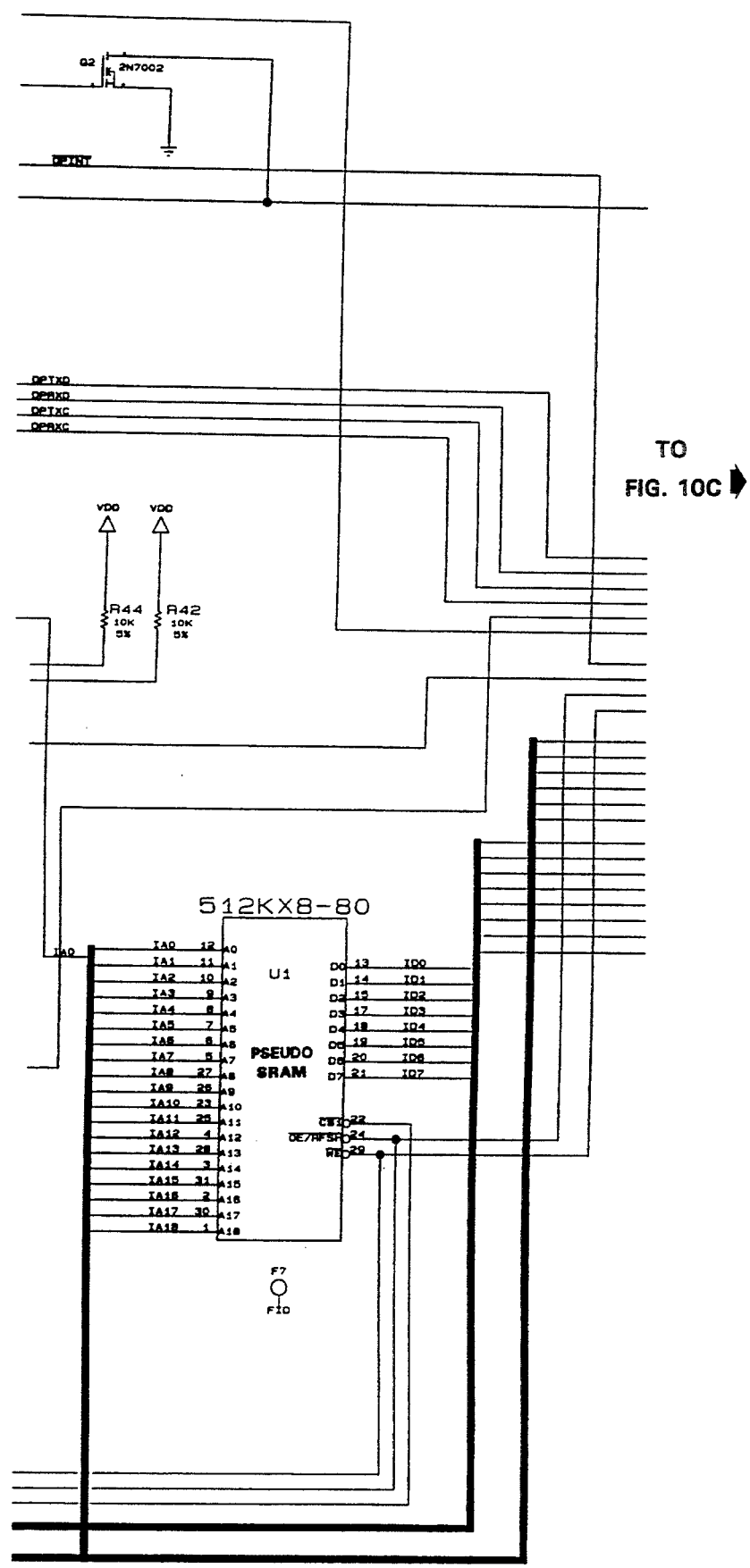
Figure 10C:
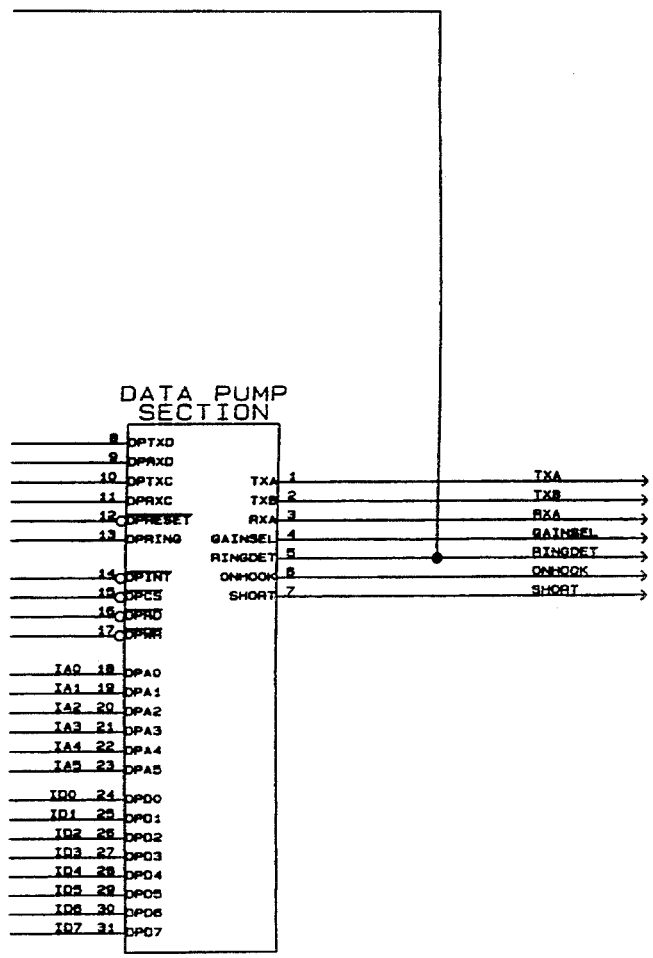
Figure 11A:
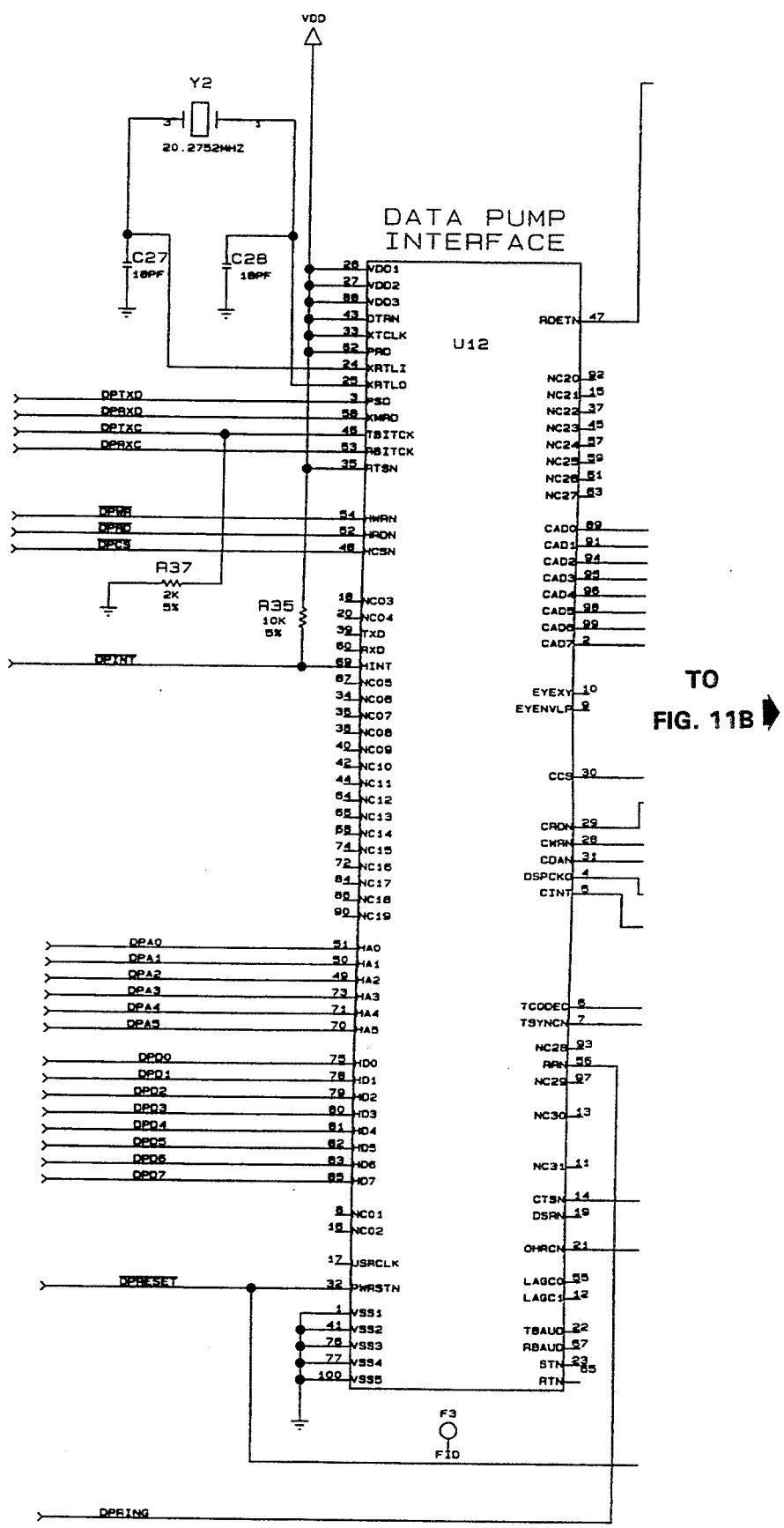
FIG. 11 is a detailed schematic diagram of a preferred modem module implemented by an AT&T V.32 data pump chip set.
Figure 11B:
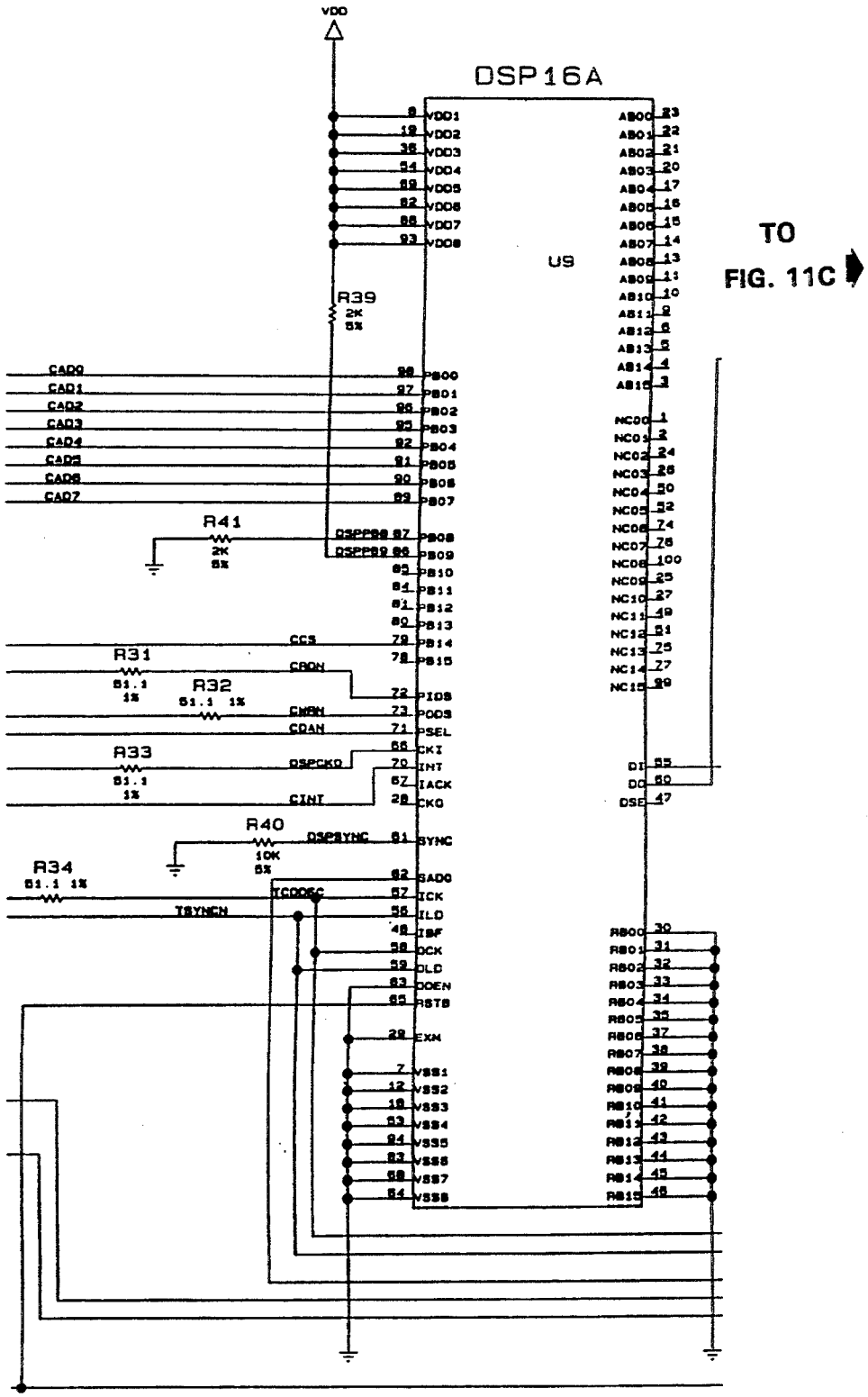
Figure 11C:
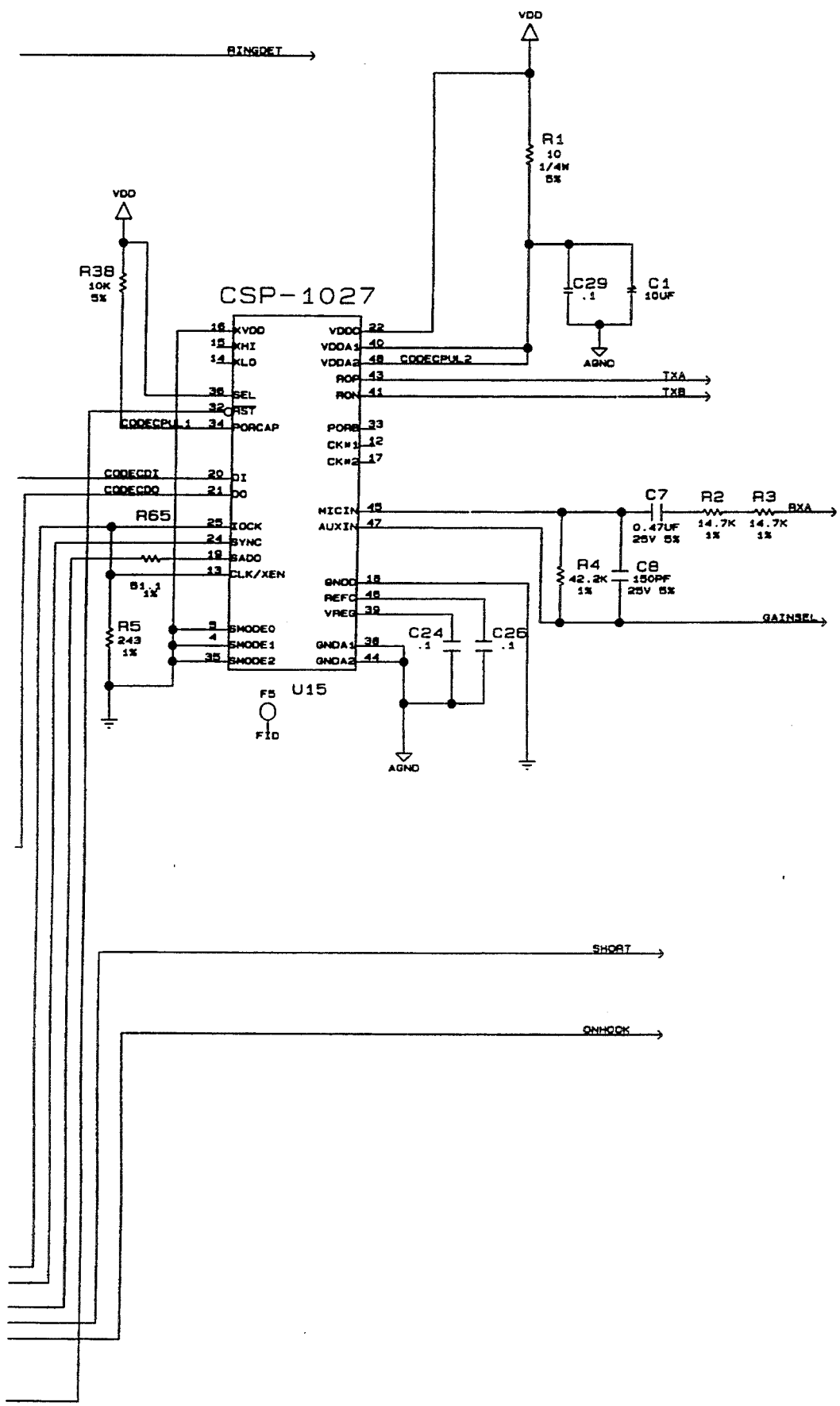
Figure 12A:
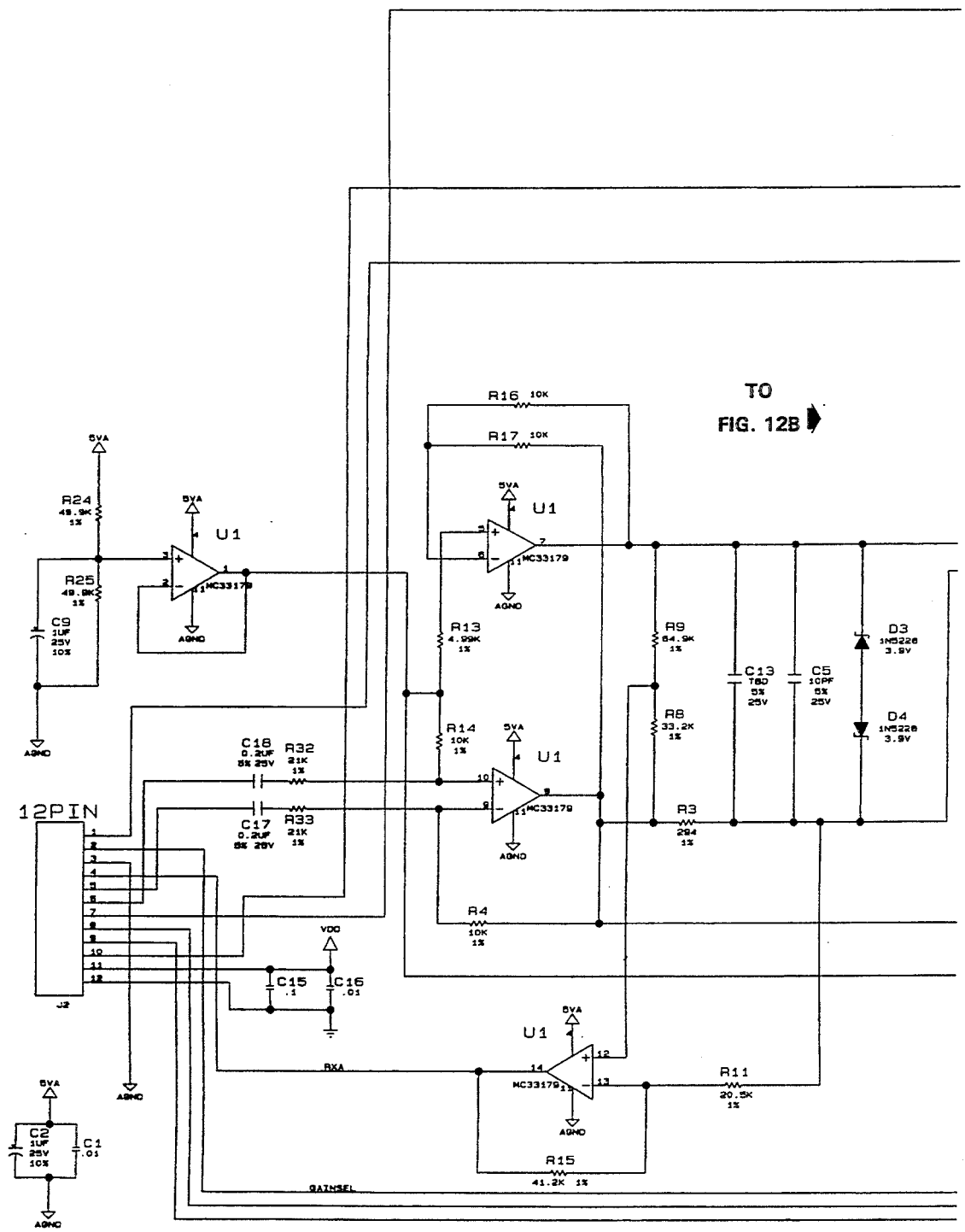
FIG. 12 is a schematic diagram of a preferred data access arrangement (DAA)
Figure 12B:
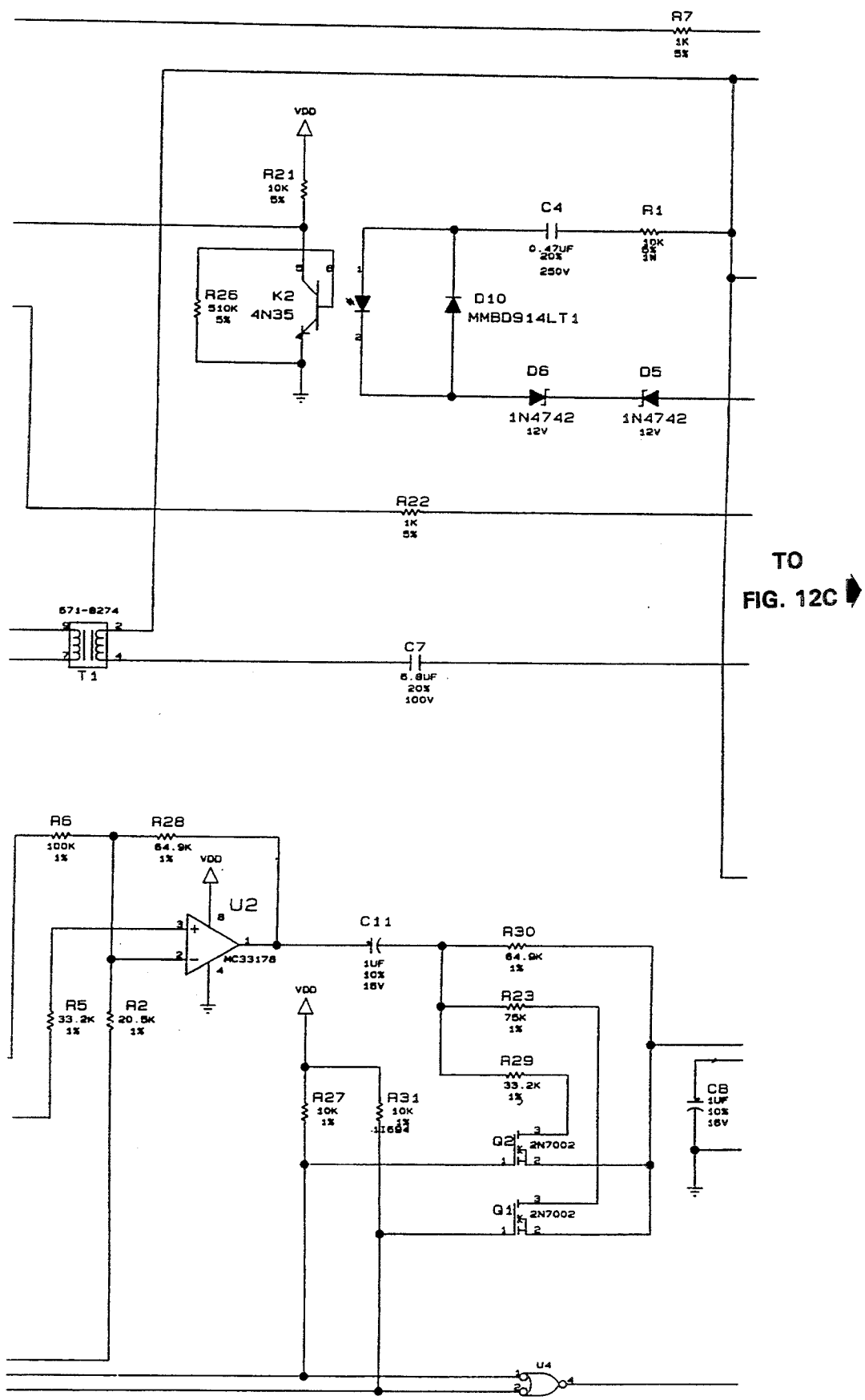
Figure 12C:
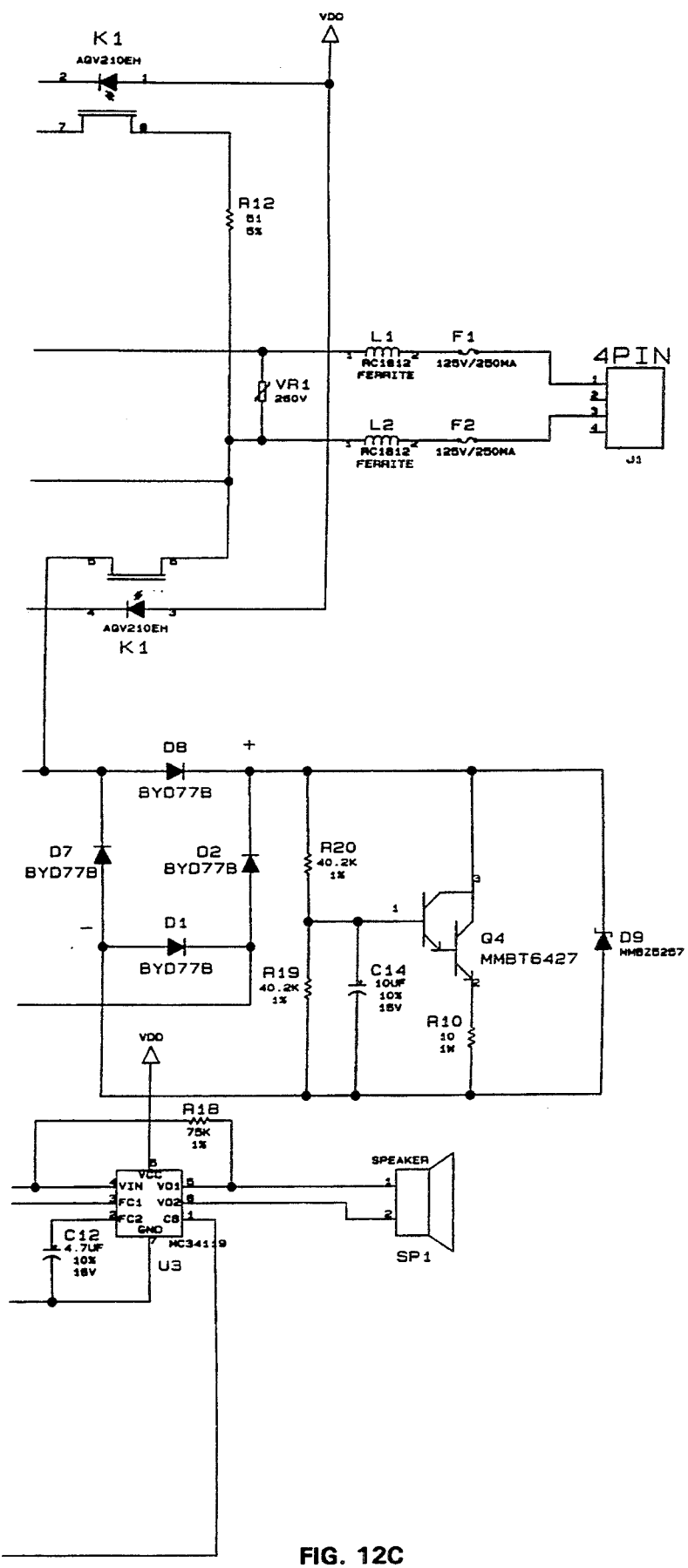

With reference now to FIGS. 10–12, there are shown schematic diagrams of a preferred embodiment of the present invention. In FIG. 10, a top level schematic diagram showing the interface between a 68302 microprocessor, the modem controller 34, and a data pump section which is the modem module 36 for a preferred embodiment. In FIG. 11, a detailed schematic diagram of the data pump section/modem module is shown. In this embodiment, the modem module 36 is formed with an AT&T V.32 chip set. This chip set is comprised of a data pump interface, a digital signal processor (DSP) and a codec. This chip set is coupled to a DAA 54, as found in FIG. 12. While specific manufacturers have been disclosed for the components of a preferred embodiment, the present invention encompasses components manufactured elsewhere with equivalent functionality.

The three components of the data pump chip section together perform the function of turning the binary data into an analog signal that can be transmitted on the PSTN. The data pump interface functions to connect the DSP to the modem controller 50. This involves adapting signal timing and bus isolation for each of the two smart devices. The DSP is the digital signal processor that actually perform mathematical manipulations of data such that it is in a format that is compatible with an a analog PSTN line. The codec does digital to analog and analog to digital conversions of modulated data as well as signal amplification and echo cancelling allowing the received signal to be interpreted separately while on the same line as the transmitted signal.

With reference now to FIGS. 3, 4 and 5A–5D, there is shown a block diagram and flow charts of software referred to as redirector software 58. The redirector software's function is to permit the use of existing modem control software to transparently work with the modem adapter 10 of the present invention. Existing modem control software, e.g., CROSSTALK, PROCOMM, MIRROR, etc., presume the existence of a serial I/O chip, 8250 or equivalent, as a communication port at a specified I/O location. The serial I/O chip, referred to as a UART or universal asynchronous receiver transmitter, or a USART is the interface between the PC and a modem or serial RS-232 link. These communication I/O ports in a PC are referred to as COM1, COM2, COM3 and COM4 where the first two ports are located at default address blocks beginning at $0 \times 3F8$ and $0 \times 2F8$, respectively. However, in the present invention, the modem adapter 10 is instead interfaced to the standard PC parallel port 20 on the PC 22 at a specified, but different, I/O location. These standard PC parallel ports are referred to as LPT1, LPT2 and LPT3 where the first two ports are typically located at default address blocks starting at 0×378 and 0×278, respectively. While the designation of the I/O port address is normally alterable from a menu selection in the modem control software, the I/O protocol for interfacing to a serial I/O port, which is normally dedicated to interface to a modem or other serial interface, and a standard PC parallel port, which is normally dedicated to interface to a Centronics compatible printer, differ significantly. Thus, the redirector software 58 intercepts serial I/O port commands and instead outputs reformatted parallel port commands to the modem adapter 10 to permit the transparent use of the existing modem control software. Due to the mode of operation for the microprocessor required by the redirector software 58, this task cannot be accomplished on all compatible PCs but instead can only be accomplished on PCs with a 386 or later generation processor as its microprocessor controller. Thus, the 386, 486, Pentium, future compatible processors and equivalents support the use of the redirector software 58 while PCs based upon the 86, 186 and 286 or equivalent microprocessors cannot be supported.

Figure 3:
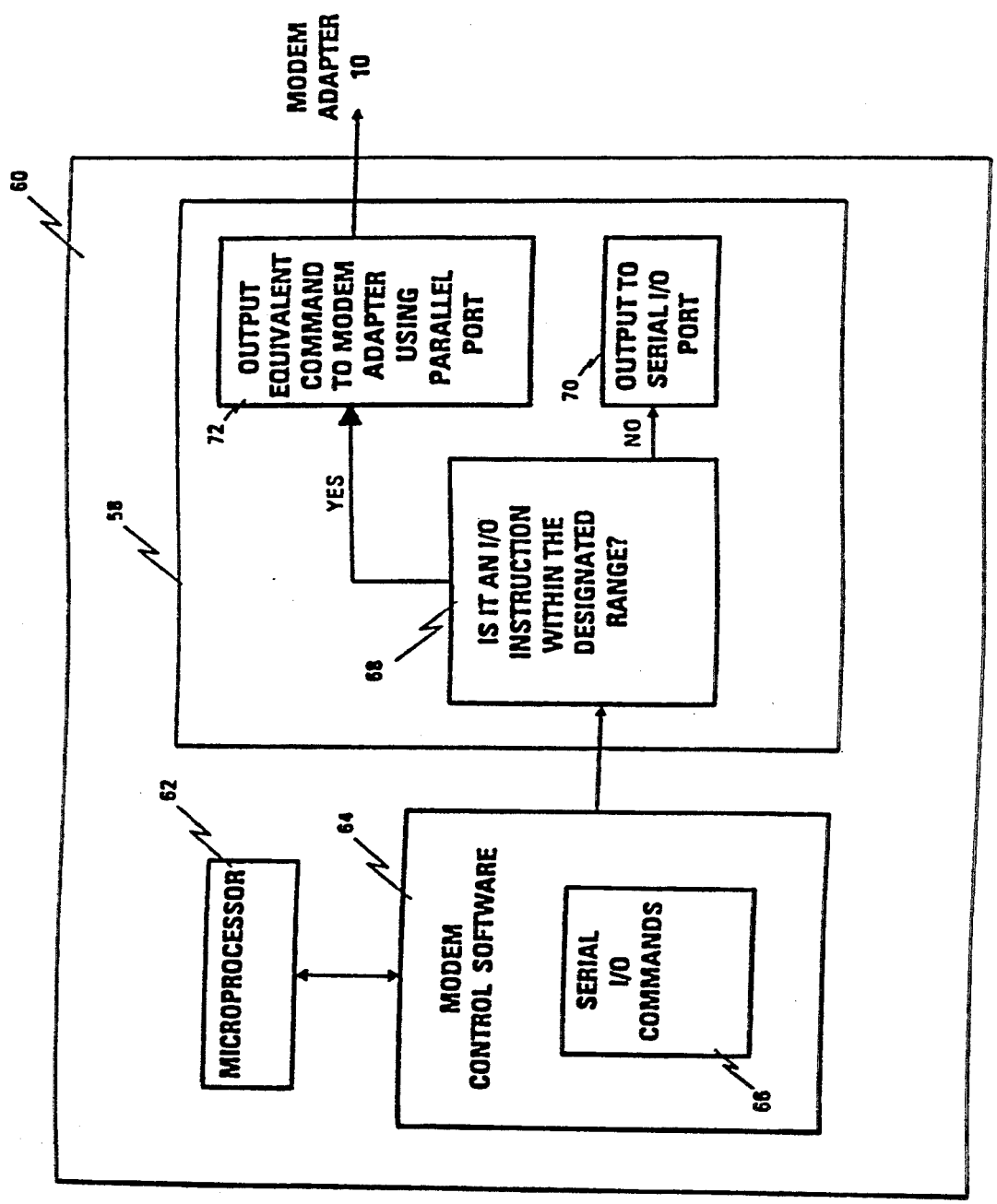
FIG. 3 is a block diagram depicting the interface of the redirector software with an IBM-compatible PC.
Figure 4:
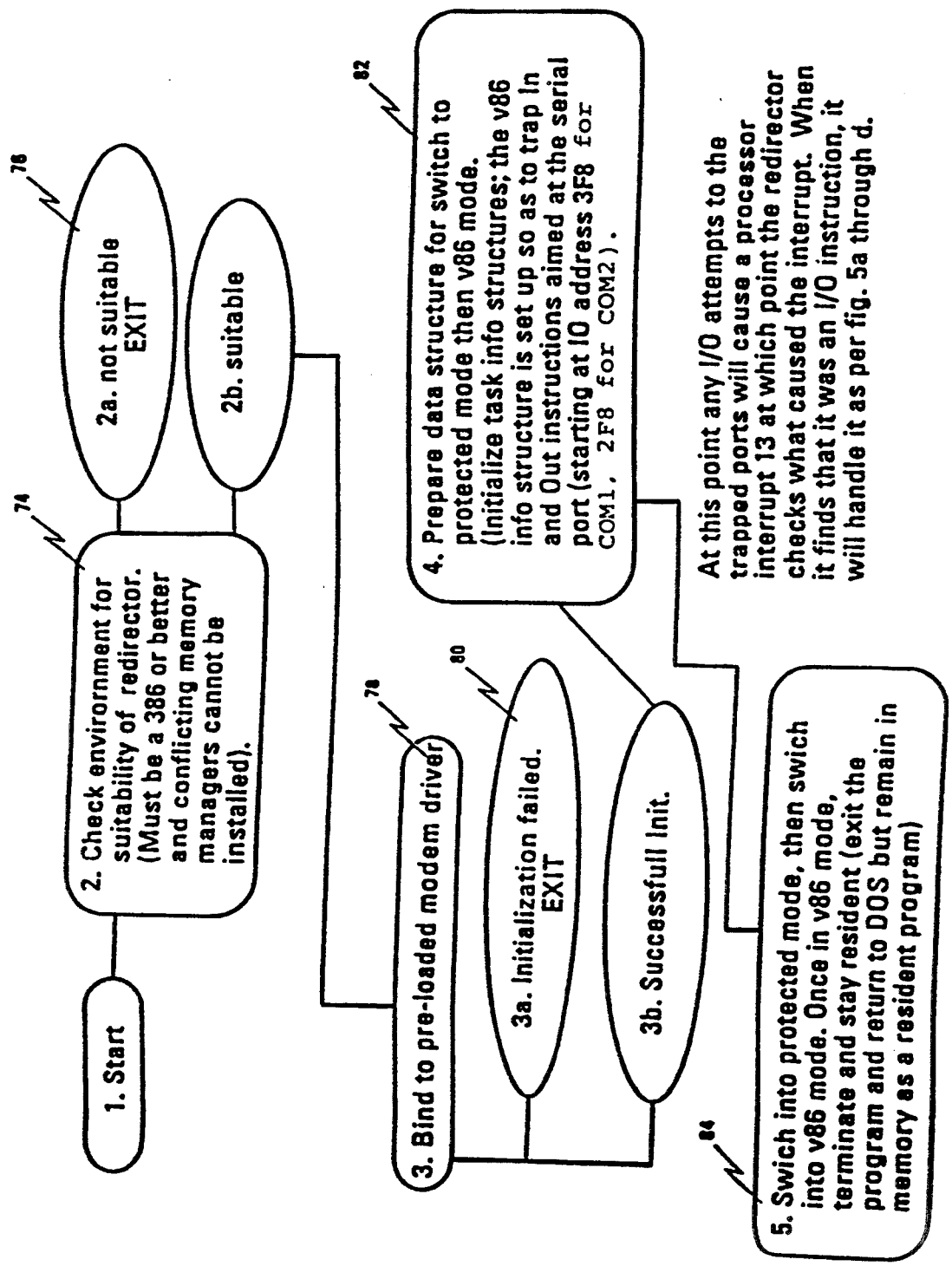
FIG. 4 is a flow chart depicting the initialization routine executed by the redirector software for interfacing existing modem control software with the modem adapter.

With specific reference to FIG. 3, a block diagram is shown of the redirector software 58. An IBM PC or equivalent microcomputer 60 under control of a microprocessor 62, executes software packages 64 that are normally launched and at least partially under control of the MS-DOS operating system. When the software package 64 is modem control software, the software package 64 will contain software instructions 66 that either directly output I/O commands to a designated 8250 serial I/O port or alternatively rely upon resident software routines from the BIOS (not shown), a ROM within the PC, that instead contains the I/O commands to be intercepted. From the standpoint of the redirector software 58, the actual source of the serial I/O instruction is irrelevant. The redirector software 58, as described below, determines if an I/O instruction references an I/O port within a designated range, as shown in Block 68. If the I/O instruction is outside of the designated range, the redirector software 58 passes the I/O instruction, as shown in Block 70. However, if an I/O instruction for the designated UART is detected, the redirector software 58 will reformat the instruction into an equivalent form for the modem adapter 10 and instead output this command to the designated standard PC parallel port 20, as shown in Block 72. It should be apparent from this description to one of ordinary skill in the art that since instructions to the designated UART are never permitted to occur, the existence of this UART is insignificant, thus a virtual or otherwise non-existent UART and associated I/O address can be referenced by the modem control software. Although modem control software can be made that directly supports the parallel port interface to a modem that is found in embodiments of the present invention, the vast majority of existing software only supports a conventional serial port interface. While software that directly supports the parallel port interface inherently is more efficient due to the reduced software overhead, the use of the redirector software 58 permits the use of extensive libraries of existing modem control software.

With reference now to FIGS. 4 and 5A–5C, a more detailed flow chart for the operation of the redirector software 58 is shown. Upon initialization of the PC 60, a modem driver is initially loaded which configures the modem adapter 10 of the present invention as previously described by first downloading configuration data for the parallel port controller 14 and then presenting executable code to the modem controller 34 that is executed to download the remaining modem control software. Additionally in an alternative embodiment, a driver is installed for a LAN interface. Next, the redirector software 58 is similarly executed. Initially, the redirector software 58 in Block 74 must confirm that a proper environment is available for the redirector software 58, that being the existence of a microprocessor that is a 386 or later generation of the 80×86 family of microprocessors and that a conflicting memory manager is not present. Thus, the use of an XT (86) or a 286 type AT PC will result in a failure. In these cases, the redirector software 58 will exit to Block 76 and will not be installed. The initialization sequence continues with Block 78, which binds to the preloaded modem driver and LAN driver, when present. The binding process makes routines for interfacing to the modem control and interface 16 and, when present, LAN control and interface accessible to the redirector software 58. A failure of this initialization is noted at Block 80.

Data structures are then initialized in Block 82, for switching the 386 or later generation 80×86 microprocessor into protected mode and then into virtual or v86 mode where designated ranges of I/O instructions which refer to the designated serial I/O port can be trapped. In the case of COM1, the default range of I/O instructions is from 0×3F8–0×3FF, while in the case of COM2 the default range of I/O instructions is from 0×2F8–0×2FF. However, the redirector software 58 may be configured to work with other than the default I/O ranges. Specifically, an I/O permission bitmap is generated for the current task segment to identify the I/O instructions to be trapped. The microprocessor 62 is then switched in Block 84 into protected mode and then into v86 mode. Once the initialization process is completed, the redirector software 58 terminates but remains resident in memory, returning control to MS-DOS which will now be running in v86 mode rather than real mode. Consequentially, all I/O instruction to the designated address ranges will be trapped and redirected to the modem adapter 10.

Once the redirector software 58 has been configured, the initialized hardware in the microprocessor 62, running in v86 mode, will trap any I/O instructions within the designated range and cause an interrupt, specifically to interrupt 13, as defined by the 80×86 microprocessor's hardware. This interrupt is directed toward a redirector interrupt routine which is now resident in memory.

With reference now to FIG. 5A–5D, typical examples of the processing of the redirection software 58 are given. In FIG. 5A, an OUT instruction within the specified I/O range is intercepted by the microprocessor 62. The microprocessor 62 then generates an interrupt to the redirector software 58. The redirector software 58 identifies this type of output command as a send data command and subsequently reformats this command into a parallel port compatible send data command for the modem adapter 10. The reformatted command is then sent to the designated standard PC parallel port. Similarly, as shown in FIG. 5B, the redirector software 58 intercepts an IN instruction that is used to receive data from the USART. However in this case, data may have been previously received and stored in a FIFO buffer, present in the redirector software 58. In this case the redirector software 58 simply returns the stored data. Thus, the throughput of the system may be improved due to this expanded capacity from the FIFO. In FIG. 5C, an IN instruction is instead identified as a request for status from the USART. Since the actual hardware associated with the modem of the present invention differs significantly from a UART-modem combination as found in the prior art, the redirector software 58 will reformat the status data into a form compatible with the UART status of the prior art, thus achieving transparent operation while interfacing to the modem adapter 10 of the present invention. In FIG. 5D, an OUT instruction directed to the USART control port is intercepted by the redirector software 58 and translated into a command to the modem control and interface 16. Included in the application file is Appendix A which is a software listing of the redirector software 58 configured for operation with MS-DOS 6.0, illustrating the features that have been described. See the application for the Appendix.

Figure 6:
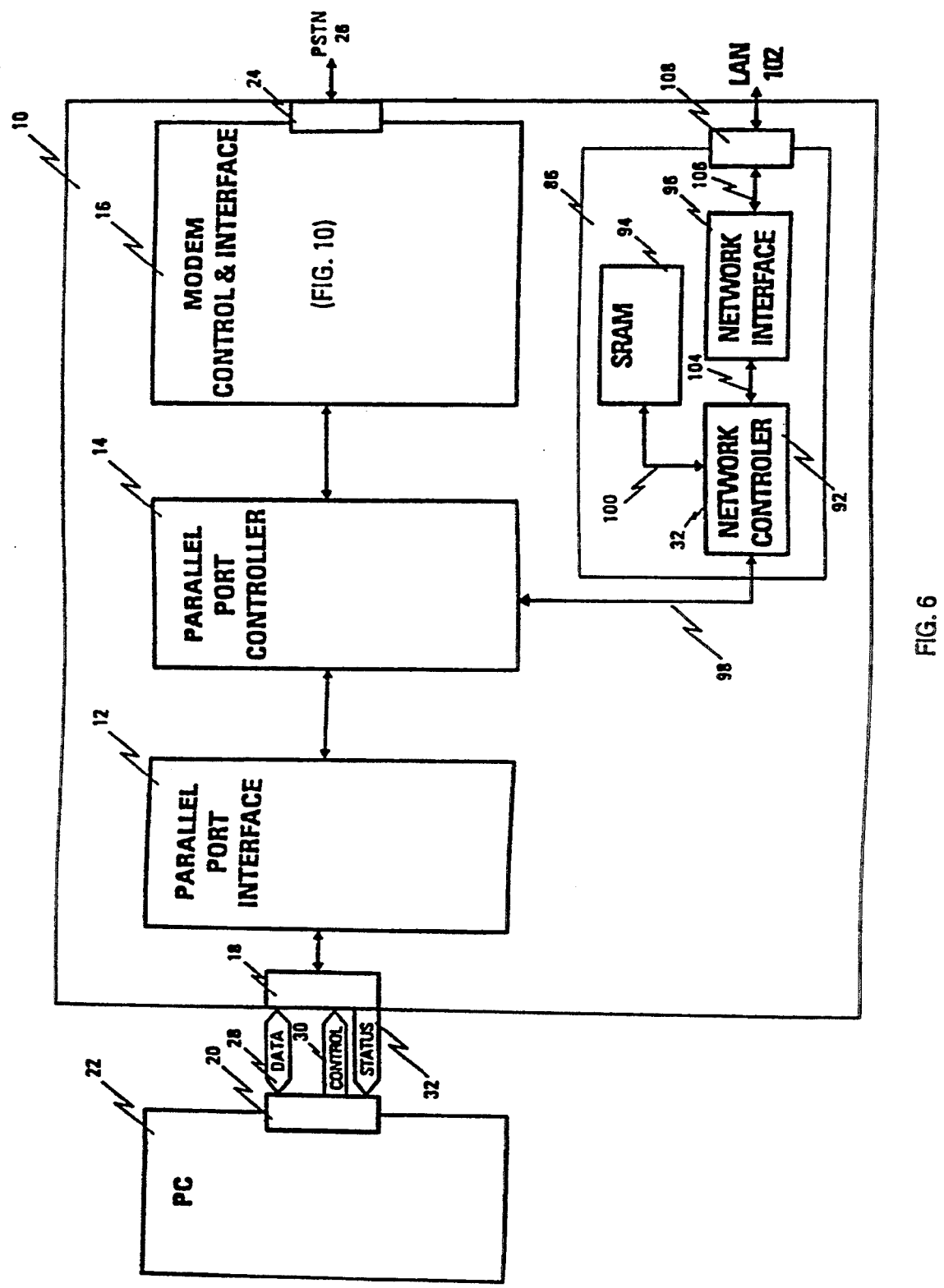
FIG. 6 comprises a functional block diagram of a preferred LAN/modem adapter in accordance with the present invention.

With reference now to FIG. 6, there is shown an alternate preferred embodiment of the present invention. In this embodiment, a LAN control and interface 86 is additionally included within the modem adapter to form a LAN/modem adapter 10. The interface of a LAN or network adapter to a standard PC parallel port has already been disclosed in a commonly assigned patent. Additionally, selection logic is included within the parallel port controller 14 to alternatively interface to either the modem control and interface 16 or the LAN control and interface 86, thus sharing the standard parallel port 20. As previously discussed, the PC 22 communicates with the modem control and interface 16 via registers located within the parallel port controller at addresses within the range of F0 to F3 (ORed with 04 for data reads). In a similar manner the LAN control and interface 86 is instead addressed when the most significant nibble of the address is not an F, e.g., the most significant nibble equals 0-E. Similarly, a single data bit is used to distinguish reads and writes to registers associated with the LAN control and interface 86. In a preferred embodiment, the read/write determination is done within the LAN control and interface 86 using data bit 6. Thus, addresses of 00 to 0F output to registers and addresses of 40 to 4F input from registers used by the LAN control and interface 86.

Figure 7:
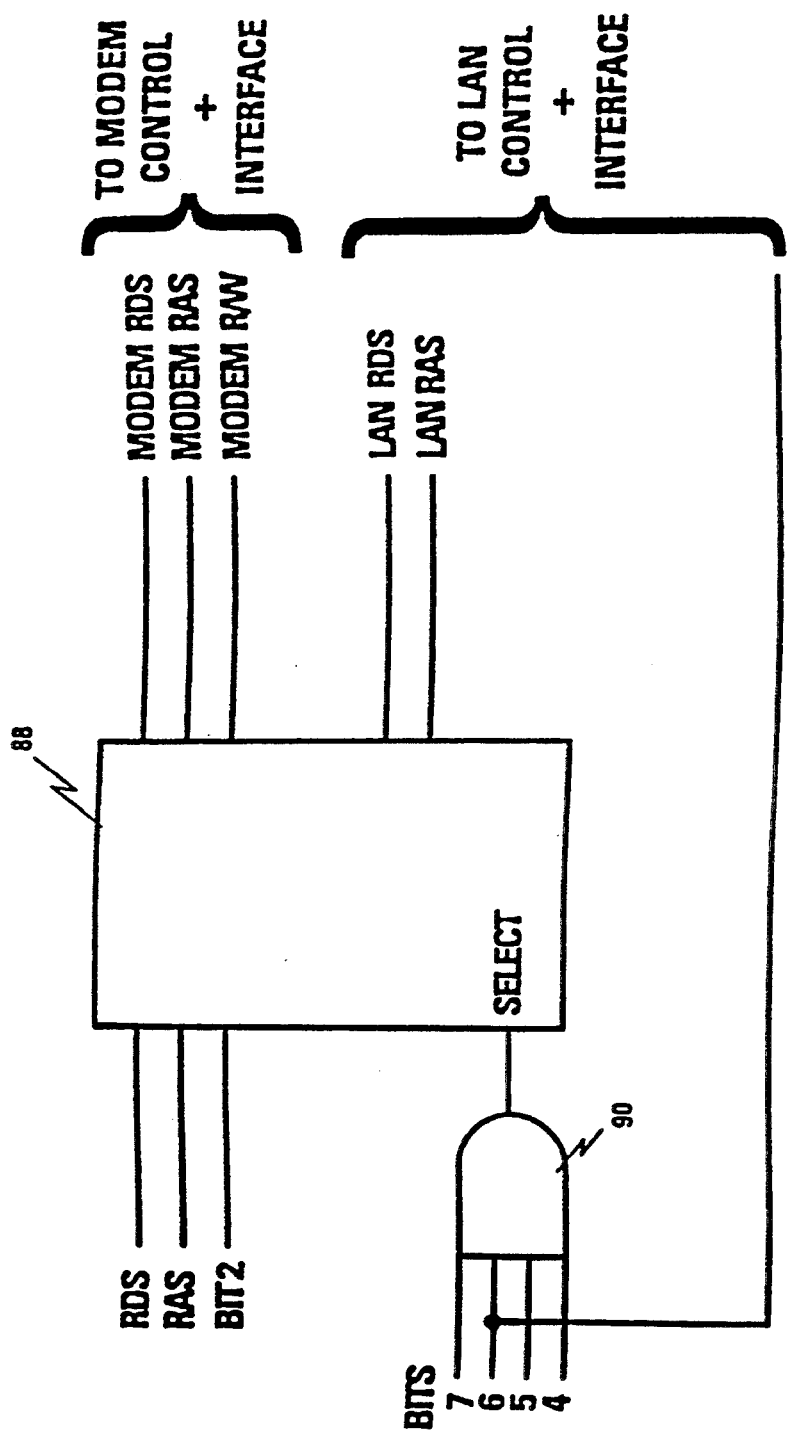
FIG. 7 is a block diagram of the parallel port selection logic of a preferred embodiment.
Figure 8A:
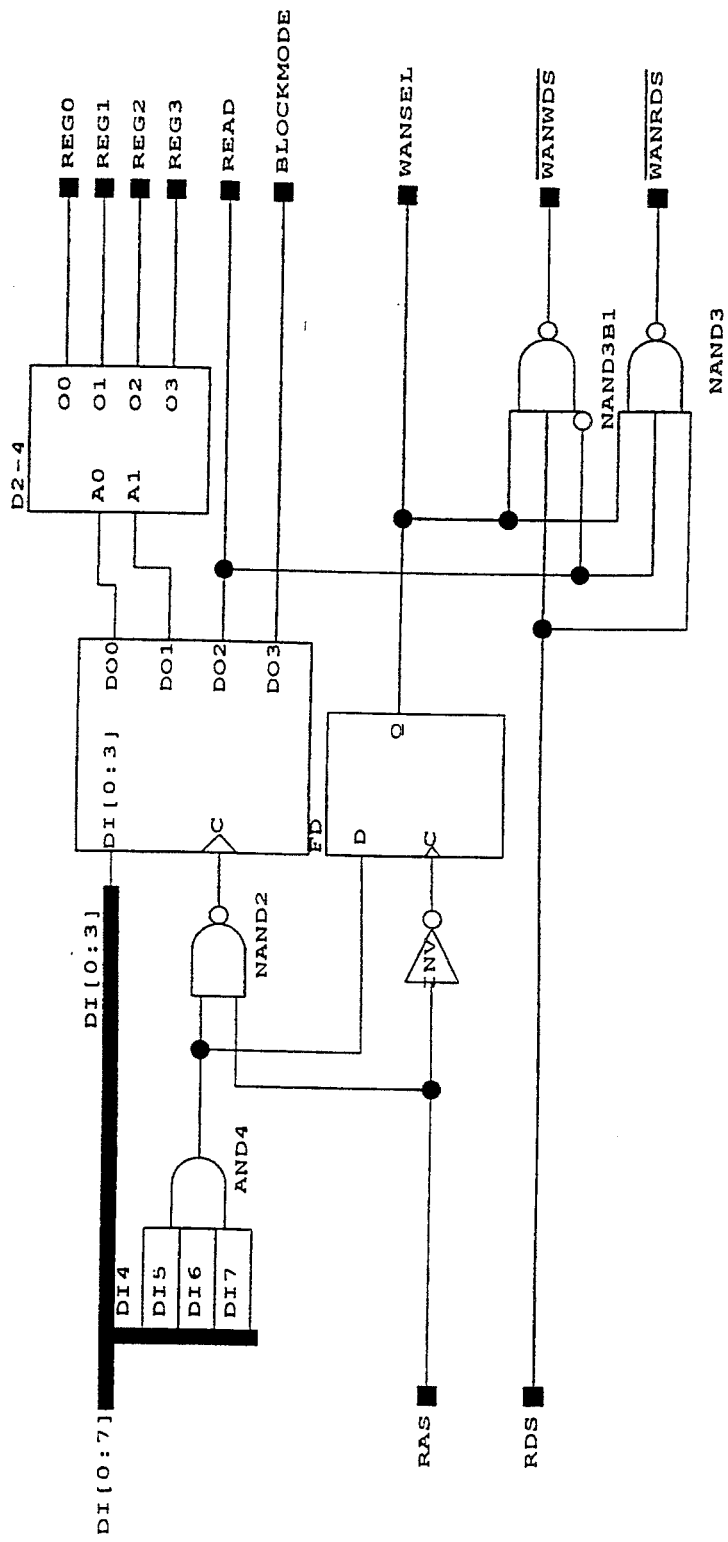
FIGS. 8A–8I are schematic diagrams of the parallel port controller logic which can be implemented on a field programmable gate array (FPGA) for interfacing the standard PC parallel port to the modem control and interface.
Figure 8B:
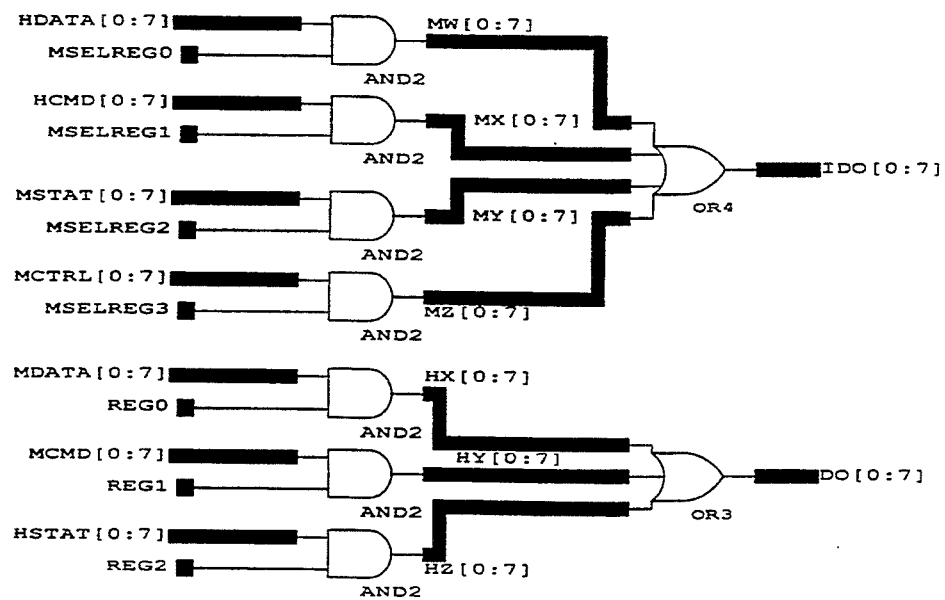
Figure 8C:
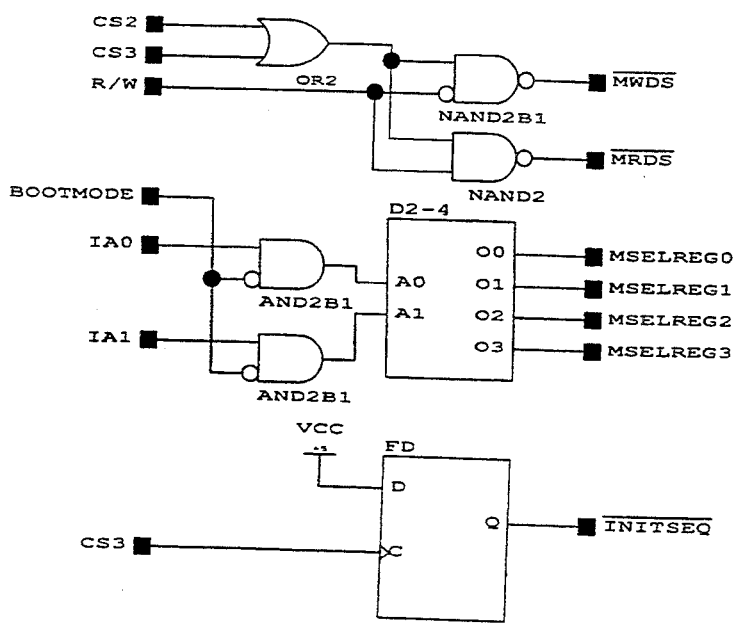
Figure 8D:
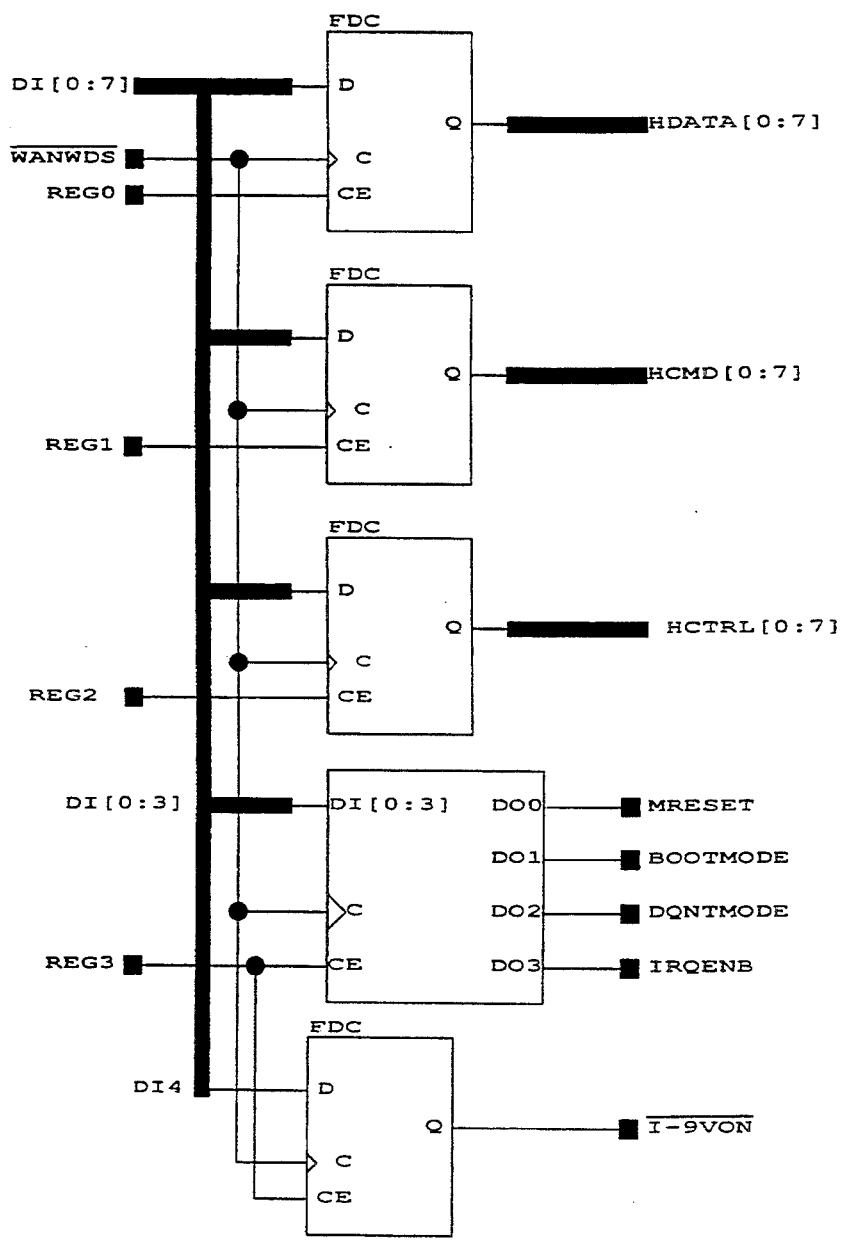
Figure 8E:
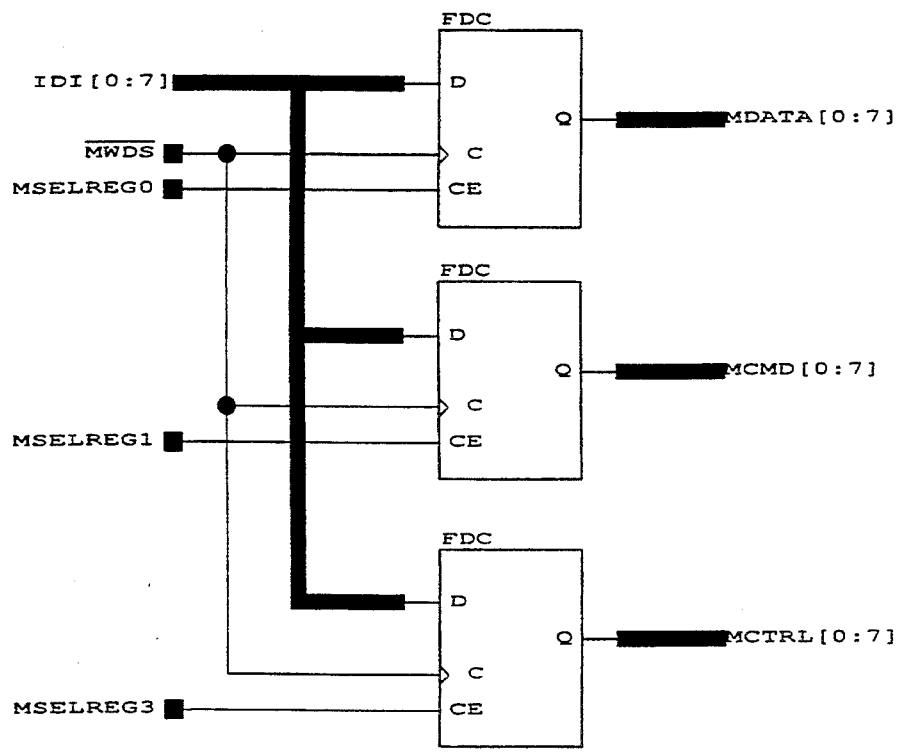
Figure 8F:
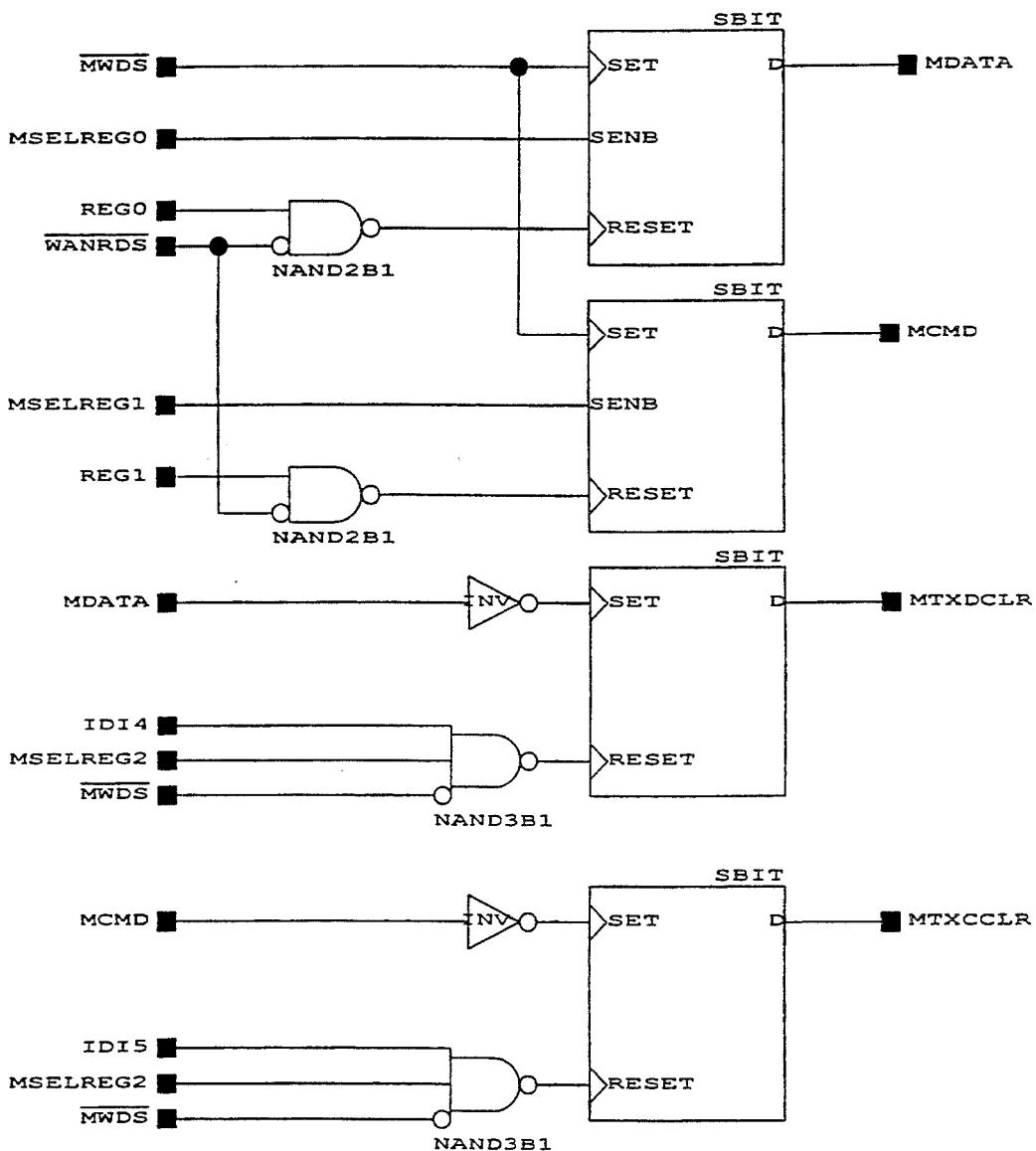
Figure 8G:
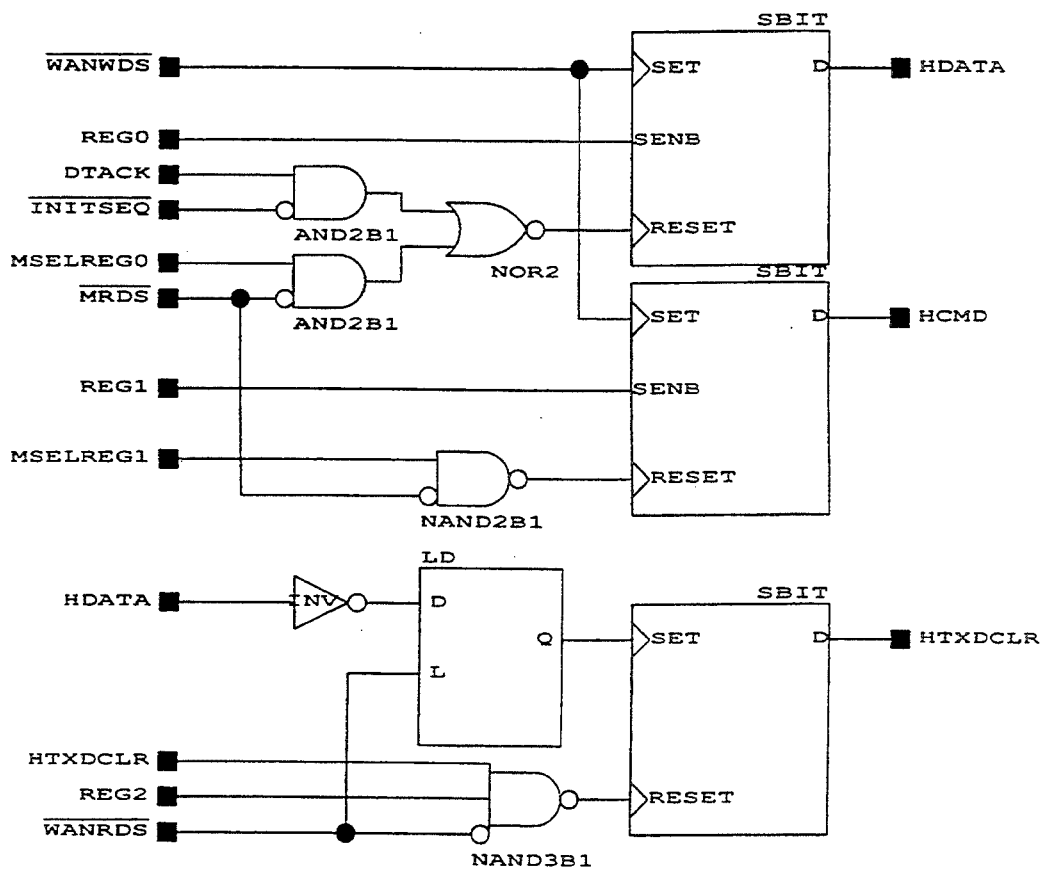
Figure 8H:
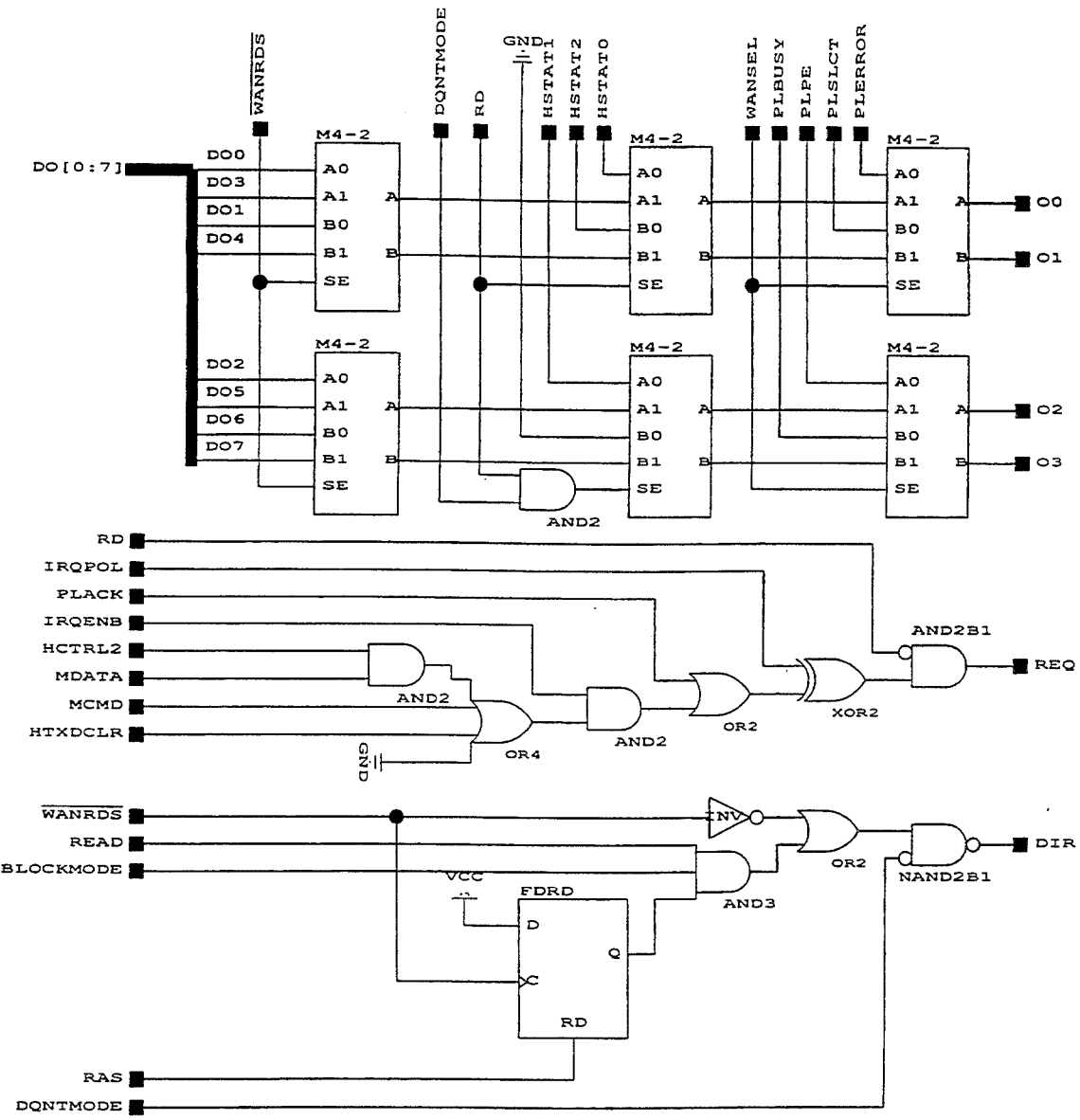
Figure 8I:
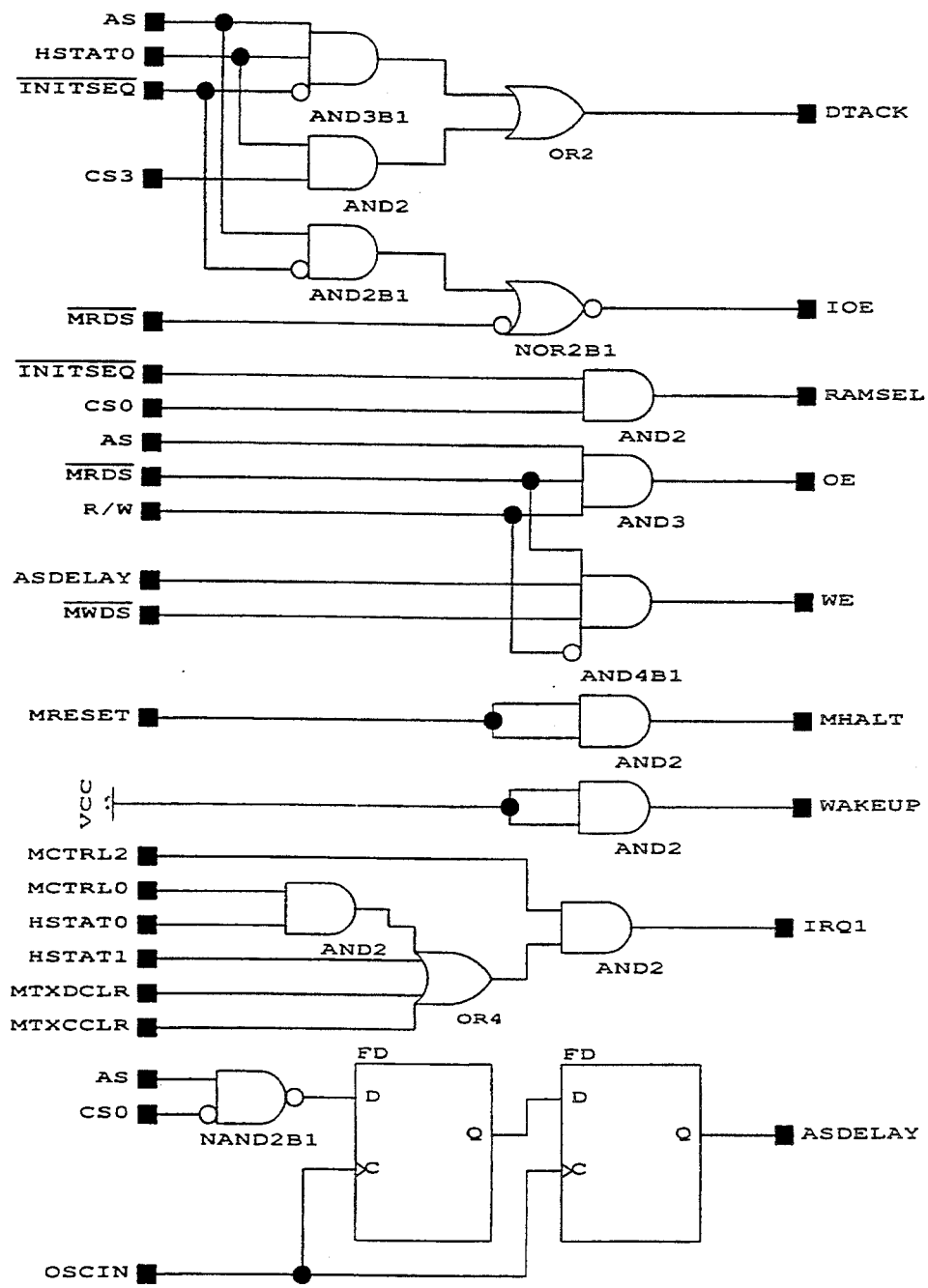

With reference now to FIG. 7, there is shown a block diagram of logic used in a preferred embodiment of selection logic contained within the parallel port controller 14 comprised of a multiplexor 88 and an AND gate 90. The AND gate 90 ANDs data bits 0–7 to determine whether or not a register access is directed to the modem control and interface 16 by recognizing addresses of Fx. This signal is used as a select signal to the multiplexor 88. The multiplexor 88 selectively passes the RDS and the RAS dependent upon the select input generated by AND gate 90. Additionally, a read/write signal is generated according to the selected register address for the modem control and interface 16 or the LAN control and interface 86. Schematic diagrams of the logic associated with a preferred embodiment as implemented within a FPGA are shown in FIGS. 8A–8I.

In a manner similar to that previously described in association with the modem control and interface 16, the LAN control and interface 86 is also capable of transferring data without continuous control from the PC 22. Thus, while the selection logic only permits the PC to communicate with either the modem control and interface 16 or the LAN control and interface 86 during each I/O operation, the other interface can concurrently communicate using local control. Thus, it should be apparent to one of ordinary skill in the art that simultaneous communications with a WAN and a LAN are possible with embodiments of the present invention.

With reference again to FIG. 6, the LAN control and interface 86 is comprised of three main portions, a LAN controller 92, an SRAM 94 and a LAN interface 96. The LAN controller 92 is coupled to the parallel port controller 14 via a data/control path 98 that functions as a PC interface to bidirectionally transfer data to the standard PC parallel port 20. The SRAM 94, coupled to the LAN controller 92 using path 100, temporarily stores packets of data that are transferred across a network 102, commonly referred to as a local area network (LAN). The LAN interface 96 is coupled to the LAN controller 92 using path 104 and conditions network data according to IEEE 802 to the LAN 102 through a connector 108. Connector 108 is coupled to the LAN interface 96 using path 106. Connector 108 may be either a BNC connector or a RJ-45 modular plug, depending upon the mode of operation required.

Figure 13A:
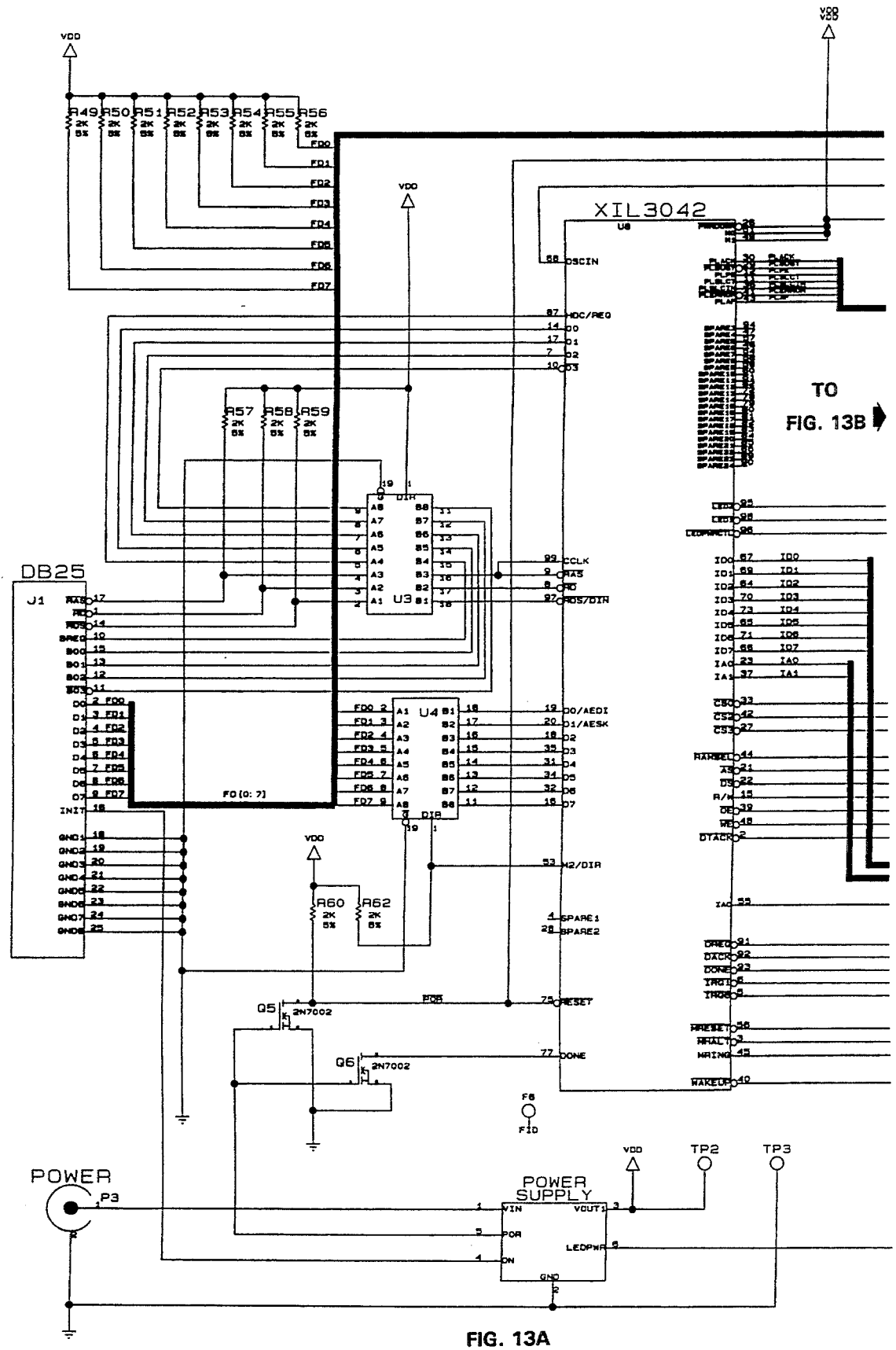
FIG. 13 is a top level schematic diagram of a preferred LAN/modem adapter.
Figure 13B:
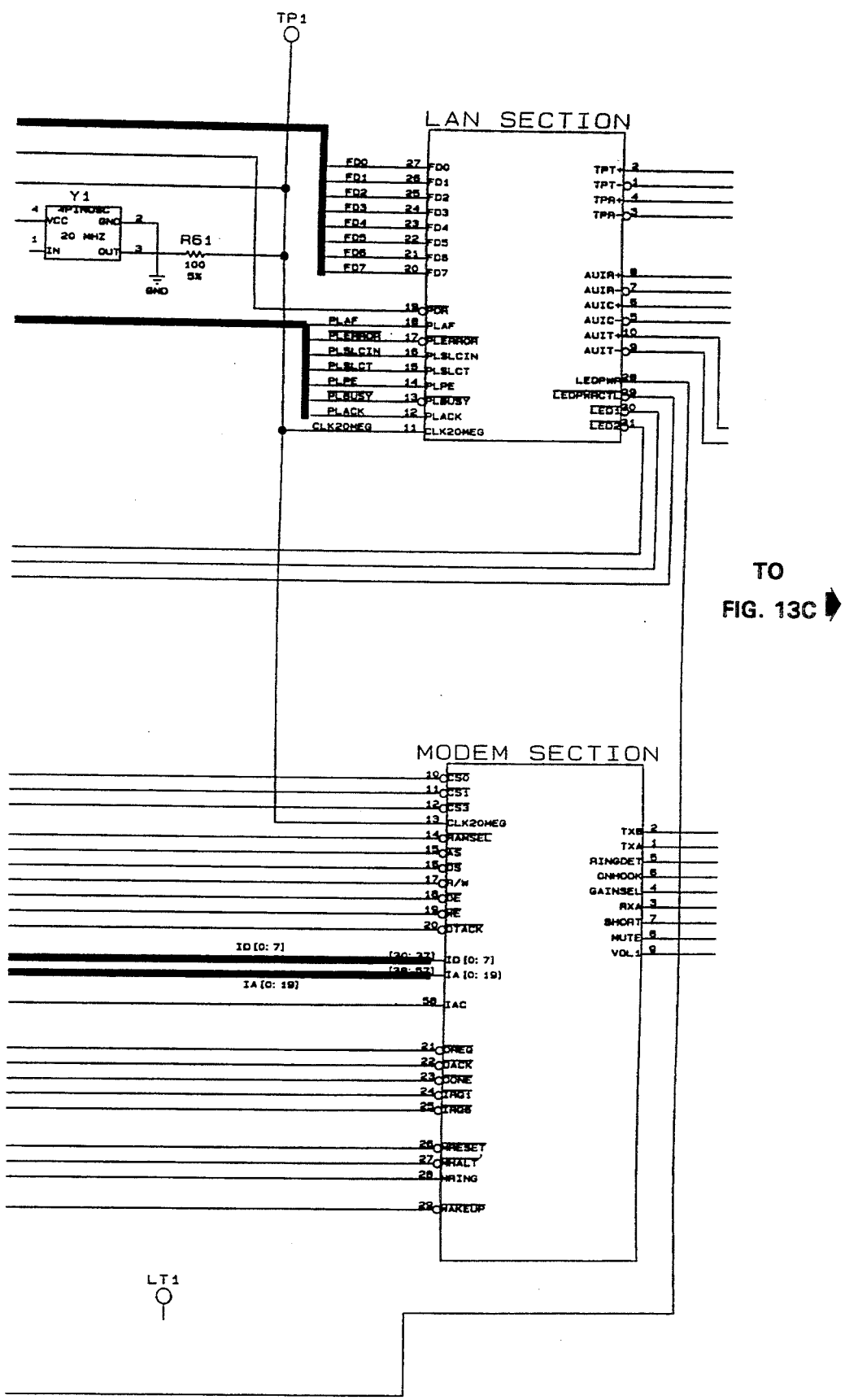

With reference to FIG. 13, there is shown a detailed schematic diagram of a preferred embodiment of a LAN/modem adapter. As shown in FIG. 13, a DB-25 parallel port connector is coupled to a bidirectional buffer U3 and unidirectional buffer U4 which form the parallel port interface 12. A field programmable gate array (FPGA), U5, forms the parallel port interface controller 14 which controls both the interface to the parallel port and the selection/port sharing logic for the modem section (modem control and interface 16) and the LAN section (LAN control and interface 86). The detailed schematic diagram of the modem has already been shown in FIGS. 10, 11 and 12.

Figure 9:
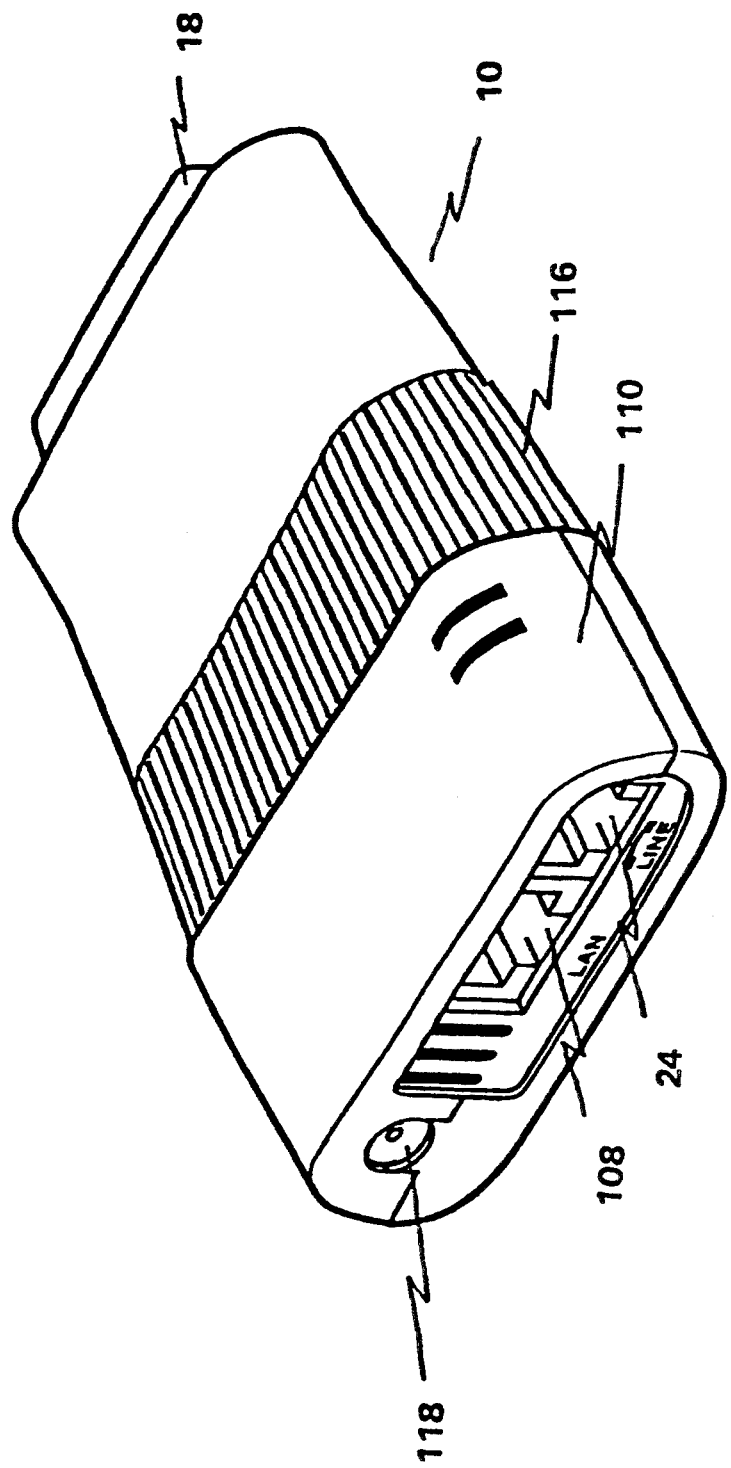
FIG. 9 is an isometric view showing a housing of a preferred embodiment in accordance with the present invention.

With reference now to FIG. 9, there is shown the external configuration of a preferred embodiment of the modem or alternatively LAN/modem adapter 10 in accordance with the present invention. The modem adapter 10 is comprised of a substantially enclosed rounded rectangular housing 110. The parallel port connector 18 is mounted on one end of the housing 110 for mating connection to the standard PC parallel port 20. The parallel port connector 18 is a 25-pin, male, D-shell connector which mates to a complementary female connector as found on the standard PC parallel port 20 of a personal computer (PC). First and second captive screws 112 and 114 (not shown) are mounted in the housing 110 for coupling to threaded holes typically provided adjacent to a standard PC parallel port connector. A tractor belt 116 is mounted for rotation within a recess around the circumference of the housing 110 and coupled to screws 112 and 114 to enable a user to cooperatively rotate the screws 112 and 114.

The RJ-11 connector 24 is mounted on the opposite end of the housing 110 and is configured to connect the modem adapter 10 to a public switched telephone network (PSTN). Connector 108 is also mounted on the opposite end of the housing 110. Connector 108 is configured to connect to a local area network media, e.g., an unshielded twisted pair Ethernet network using an RJ-45 connector. Alternatively, connector 108 is a BNC connector (not shown) for connecting to a coaxial cable as is used in standard Ethernet networks. The housing 110 additionally includes a socket 118 intended to receive a conventional AC adapter jack which supplies a DC voltage (e.g., 12 volt D.C. unregulated or 5 volt D.C. regulated) for providing power to the modem.

The rectangular housing 110 is preferably dimensioned to be substantially pocket sized so that it can be conveniently carried by a user. For example, the modem adapter 10 in accordance with the present invention currently being manufactured by the assignee of the present application has a length equal to approximately 4½ inches, a width equal to approximately 2½ inches, and a height equal to approximately 1 inch. The modem adapter 10 is intended to readily connect externally to any standard PC parallel port, thus eliminating the difficulties with prior art circuit board modems. The external configuration of the modem 10, as depicted in FIG. 9 makes it particularly suitable for use with laptop computers and also for PCs in which the available slots, or power, are at a premium.

Although the present invention has been described in detail with reference only to the presently-preferred embodiments, those of ordinary skill in the art will appreciate that various modifications can be made without departing from the invention. Accordingly, the invention is defined by the following claims.

I claim:

1. A modem adapter for bidirectionally interfacing an internal bus of a personal computer (PC) to a telephone network via a standard PC parallel port, comprising:
    a modem module having an analog interface and a digital interface and including means for responding to digital signals externally supplied to said digital interface for outputting representative analog signals at said analog interface and responding to analog signals externally supplied to said analog interface for outputting representative digital signals at said digital interface;
    a modem controller having a PC interface and a modem interface;
    a parallel port controller configured for connection to a standard PC parallel port for bidirectionally transferring data bits in parallel between the PC internal bus and said modem controller PC interface; and
    means responsive to modem control software executed by said personal computer for bidirectionally communicating data to said parallel port controller from the PC internal bus;
    said modem controller including means responsive to data bits supplied to said PC interface from said parallel port controller for causing said modem module to generate a representative analog signal at said analog interface and responsive to digital signals at said modem module digital interface for transferring data bits in parallel to said parallel port interface means.

2. A modem adapter for bidirectionally interfacing an internal bus of a personal computer (PC) to a telephone network via a standard PC parallel port as in claim 1, additionally comprising:
    a modem housing enclosing said modem module, said modem controller and said parallel port controller; and
    a 25-pin, D-shell connector, integral to said modem housing, that physically connects said modem housing and electrically connects said modem adapter to the standard PC parallel port.

3. A modem adapter for bidirectionally interfacing an internal bus of a personal computer (PC) to a telephone network via a standard PC parallel port as in claim 2, additionally comprising a data access arrangement for coupling the telephone network to said modem module.

4. A modem adapter for bidirectionally interfacing an internal bus of a personal computer (PC) to a telephone network via a standard PC parallel port as in claim 3, additionally comprising an RJ-11 connector, integral to the said modem housing, that electrically connects said data access arrangement to the telephone network.

5. A modem adapter for bidirectionally interfacing an internal bus of a personal computer (PC) to a telephone network via a standard PC parallel port as in claim 4, wherein said modem controller additionally outputs a serial digital signal to said modem module for modulation and receives a demodulated serial input signal from said modem module.

6. A modem adapter for bidirectionally interfacing an internal bus of a personal computer (PC) to a telephone network via a standard PC parallel port as in claim 5, additionally comprising means to selectively couple commands from the standard PC parallel port to a first or second device wherein the first device is said modem controller.

7. A modem adapter for bidirectionally interfacing an internal bus personal computer (PC) to a telephone network via a standard PC parallel port as in claim 6, additionally comprising a LAN control and interface wherein said LAN control and interface is the second device.

8. A modem adapter for bidirectionally interfacing an internal bus of a personal computer (PC) to a telephone network via a standard PC parallel port as in claim 7, wherein said personal computer is capable of interfacing to a serial I/O port using serial I/O instructions and said personal computer is under control of a microprocessor, further including:
    means to intercept serial I/O instructions to the serial I/O port before execution by the microprocessor;
    means to reformat said serial I/O instructions into parallel I/O instructions; and
    means to redirect said parallel I/O instructions to the standard PC parallel port.

9. A modem adapter for bidirectionally interfacing an internal bus of a personal computer (PC) to a telephone network via a standard PC parallel port as in claim 8, wherein:
    said microprocessor is an 80×86 operating in a protected mode; and
    said intercept means utilizes said protected mode to identify I/O instructions to be intercepted.

10. A modem adapter for bidirectionally interfacing an internal bus of a personal computer (PC) to a telephone network via a standard PC parallel port as in claim 9, wherein said intercept and redirect means are comprised of software instructions resident on the personal computer.

11. A modem adapter for bidirectionally interfacing an internal bus of a personal computer (PC) to a telephone network via a standard PC parallel port as in claim 10, wherein said modem controller is comprised of a processor executing software instructions wherein all of said software instructions are transferred from the personal computer via said modem controller PC interface.

12. A LAN/modem adapter for bidirectionally interfacing an internal bus of a personal computer (PC) to a telephone network via a standard PC parallel port and additionally bidirectionally interfacing the internal bus of the personal computer to a local area network (LAN) via the standard PC parallel port, comprising:

a modem module having an analog interface and a digital interface and including means for responding to digital signals externally supplied to said digital interface for outputting representative analog signals at said analog interface and responding to analog signals externally supplied to said analog interface for outputting representative digital signals at said digital interface;

a modem controller having a PC interface and a modem interface;

a LAN controller having a PC interface and coupled to the local area network; and a parallel port controller configured for connection to a standard PC parallel port for bidirectionally transferring data bits in parallel selectively between the PC internal bus and said modem controller PC interface and said LAN controller PC interface;

said modem controller including means responsive to data bits supplied to said modem controller PC interface from said parallel port controller for causing said modem module to generate a representative analog signal at said analog interface and responsive to digital signals at said modem module digital interface for transferring data bits in parallel to said parallel port interface means.

13. A LAN/modem adapter for bidirectionally interfacing an internal bus of a personal computer (PC) to a telephone network via a standard PC parallel port and additionally bidirectionally interfacing the internal bus of the personal computer to a local area network (LAN) via the standard PC parallel port as in claim 12, wherein said parallel port controller additionally comprises means to selectively couple said modem controller PC interface or said LAN controller PC interface to the PC internal bus.

14. A LAN/modem adapter for bidirectionally interfacing an internal bus of a personal computer (PC) to a telephone network via a standard PC parallel port as in claim 13, additionally comprising:

a LAN/modem housing enclosing said modem module, said modem controller, said LAN controller and said parallel port controller; and a 25-pin, D-shell connector, integral to said LAN/modem housing, that physically connects said modem housing and electrically connects said LAN/modem adapter to the standard PC parallel port.

15. A LAN/modem adapter for bidirectionally interfacing an internal bus of a personal computer (PC) to a telephone network via a standard PC parallel port as in claim 14, additionally comprising a data access arrangement for coupling the telephone network to said modem module.

16. A LAN/modem adapter for bidirectionally interfacing an internal bus of a personal computer (PC) to a telephone network via a standard PC parallel port as in claim 15, additionally comprising an RJ-11 connector, integral to the said modem housing, that electrically connects said data access arrangement to the telephone network.

17. A LAN/modem adapter for bidirectionally interfacing an internal bus of a personal computer (PC) to a telephone network via a standard PC parallel port as in claim 16, wherein said modem controller additionally outputs a serial digital signal to said modem module for modulation and receives a demodulated serial input signal from said modem module.

18. A LAN/modem adapter for bidirectionally interfacing an internal bus of a personal computer (PC) to a telephone network via a standard PC parallel port as in claim 17, wherein said personal computer is capable of interfacing to a serial I/O port using serial I/O instructions and said personal computer is under control of a microprocessor, further including:

means to intercept serial I/O instructions to the serial I/O port before execution by the microprocessor;

means to reformat said serial I/O instructions into parallel I/O instructions; and means to redirect said parallel I/O instructions to the standard PC parallel port.

19. A LAN/modem adapter for bidirectionally interfacing an internal bus of a personal computer (PC) to a telephone network via a standard PC parallel port as in claim 18, wherein:

said microprocessor is an 80×86 operating in a protected mode; and said intercept means utilizes said protected mode to identify I/O instructions to be intercepted.

20. A LAN/modem adapter for bidirectionally interfacing an internal bus of a personal computer (PC) to a telephone network via a standard PC parallel port as in claim 19, wherein said intercept and redirect means are comprised of software instructions resident on the personal computer.

21. A LAN/modem adapter for bidirectionally interfacing an internal bus of a personal computer (PC) to a telephone network via a standard PC parallel port as in claim 20, wherein said modem controller is comprised of a processor executing software instructions wherein all of said software instructions are transferred from the personal computer via said modem controller PC interface.

22. A system for redirecting serial I/O instructions in modem control software in combination with a personal computer (PC) wherein said PC is under control of a microprocessor and has a standard PC parallel port and said PC is capable of interfacing to a serial port, comprising:

a modem adapter coupled to the standard PC parallel port to bidirectionally transfer data with a telephone network;

means to intercept serial I/O instructions to the serial port before execution by the microprocessor;

means to reformat with said serial I/O instructions into parallel I/O instructions; and means to redirect said parallel I/O instructions to the standard PC parallel port.

23. A system for redirecting serial I/O instructions in modem control software in combination with a personal computer (PC) wherein said PC is under control of a microprocessor and has a standard PC parallel port and said PC is capable of interfacing to a serial port, as in claim 22, wherein:

said microprocessor is an 80×86 operating in a protected mode; and said intercept means utilizes said protected mode to identify I/O instructions to be intercepted.

24. A system for redirecting serial I/O instructions in modem control software in combination with a personal computer (PC) wherein said PC is under control of a microprocessor and has a standard PC parallel port and said PC is capable of interfacing to a serial port, as in claim 23, wherein said intercept and redirect means are comprised of software instructions resident on the personal computer.

25. A method of bidirectionally communicating data between a personal computer (PC) and a telephone network wherein the PC is under control of a microprocessor and has an internal bus and a standard PC parallel port comprised of an external 25-pin D-shell connector, said method comprising:

connecting a modem adapter to the telephone network;

connecting said modem adapter to the standard PC parallel port;

initializing redirector software on the personal computer to intercept before execution a specified range of serial I/O instructions on the personal computer;

executing standard modem control software on the personal computer which references a serial I/O port defined within said modem control software;

intercepting I/O instructions within the specified range and reformatting said instructions into a parallel format compatible with said modem adapter and communicating said reformatted instructions to said modem adapter via said standard PC parallel port; and controlling said modem adapter to transmit and receive data according to signals transferred in parallel from the standard PC parallel port and transferring in parallel responsive digital signals to the standard PC parallel port.

26. The method of claim 25 wherein said step of initializing said redirector software comprises:

identifying the microprocessor as a member of the 80×86 family and of a generation greater than or equal to an 80386;

generating a table to identify the range of serial I/O instructions to be intercepted;

switching the microprocessor to a protected mode and then to a virtual 86 mode; and leaving resident within memory of the personal computer, software for reformatting and redirecting intercepted I/O instructions.

27. A method of bootstrapping executable code to a microprocessor controller from a personal computer (PC) via a standard PC parallel port comprised of an external 25-pin D-shell connector, said method comprising:

connecting a modem adapter controlled by said microprocessor controller to the standard PC parallel port;

directing memory fetches from said microprocessor controller to sequentially fetch and execute bytes fetched from the standard PC parallel port;

loading local volatile memory with executable instructions fetched from the standard PC parallel port; and executing said executable instructions from said local memory to control said modem adapter.

* * * * *